United States Patent
Banister

(10) Patent No.: US 8,630,378 B2
(45) Date of Patent: Jan. 14, 2014

(54) INTERFERENCE CANCELLATION WITH IMPROVED ESTIMATION AND TRACKING FOR WIRELESS COMMUNICATION

(75) Inventor: Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1130 days.

(21) Appl. No.: 11/535,848

(22) Filed: Sep. 27, 2006

(65) Prior Publication Data

US 2007/0127558 A1 Jun. 7, 2007

Related U.S. Application Data

(60) Provisional application No. 60/748,062, filed on Dec. 6, 2005.

(51) Int. Cl.
| H03D 1/04 | (2006.01) |
| H03D 1/06 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |

(52) U.S. Cl.
USPC .......................................... 375/346; 375/285

(58) Field of Classification Search
USPC .................. 375/144, 148, 285, 346, 349, 350
See application file for complete search history.

(56) References Cited

U.S. PATENT DOCUMENTS

| 5,467,368 | A | * | 11/1995 | Takeuchi et al. ............. 375/148 |
| 6,088,383 | A | * | 7/2000 | Suzuki et al. ................. 375/148 |
| 6,426,983 | B1 | * | 7/2002 | Rakib et al. ................... 375/346 |
| 6,473,415 | B1 | * | 10/2002 | Kim et al. ..................... 370/342 |
| 6,836,647 | B2 | * | 12/2004 | Rimini et al. .............. 455/226.2 |
| 6,931,292 | B1 | * | 8/2005 | Brumitt et al. ................. 700/94 |
| 6,967,990 | B1 | | 11/2005 | Suzuki et al. |

(Continued)

FOREIGN PATENT DOCUMENTS

| CN | 1535511 A | 10/2004 |
| EP | 1392007 A1 | 2/2004 |

(Continued)

OTHER PUBLICATIONS

International Search Report and Written Opinion—PCT/US06/061706—International Search Authority—European Patent Office—Nov. 15, 2007.

*Primary Examiner* — Jean B Corrielus
(74) *Attorney, Agent, or Firm* — Ramin Mobarhan

(57) ABSTRACT

Techniques for performing interference cancellation in a wireless (e.g., CDMA) communication system are described. In one aspect, per-bin power estimates for multiple orthogonal bins are derived by estimating at least two components of these power estimates. The components may include, e.g., channel gain, noise and interference, and bin gain. Interference cancellation is performed based on the per-bin power estimates. In another aspect, interference cancellation is performed in multiple stages with fast tracking. A total power estimate and per-bin power estimates are derived for a first stage. A total power estimate is derived for a second stage. Per-bin power estimates are also derived for the second stage based on the total power estimates for the first and second stages and the per-bin power estimates for the first stage. Interference cancellation is performed for each stage based on the per-bin power estimates for that stage.

31 Claims, 15 Drawing Sheets

(56) References Cited

U.S. PATENT DOCUMENTS

| | | | |
|---|---|---|---|
| 7,016,653 B2 * | 3/2006 | Tsunehara et al. | 455/69 |
| 7,263,118 B2 * | 8/2007 | Choi et al. | 375/144 |
| 7,437,135 B2 * | 10/2008 | Pan et al. | 455/284 |
| 7,466,744 B2 * | 12/2008 | Karna | 375/147 |
| 7,623,569 B2 * | 11/2009 | Chang et al. | 375/227 |
| 7,675,985 B1 * | 3/2010 | Watson | 375/260 |
| 2002/0057730 A1 * | 5/2002 | Karlsson et al. | 375/152 |
| 2004/0131134 A1 | 7/2004 | Hiroyasu | |
| 2006/0269006 A1 | 11/2006 | Kuroda | |

FOREIGN PATENT DOCUMENTS

| | | |
|---|---|---|
| JP | 2003194916 A | 7/2003 |
| JP | 2004040295 A | 2/2004 |
| JP | 2006279590 A | 10/2006 |
| WO | WO2007102897 | 9/2007 |

* cited by examiner

QLIC Block
(for unsynchronized sectors)

INTERFERENCE CANCELLATION WITH IMPROVED ESTIMATION AND TRACKING FOR WIRELESS COMMUNICATION

The present application claims priority to provisional U.S. Application Ser. No. 60/748,062, entitled "Accelerated Tracking for Cascaded QLIC," filed Dec. 6, 2005, assigned to the assignee hereof and incorporated herein by reference.

BACKGROUND

I. Field

The present disclosure relates generally to communication, and more specifically to techniques for performing interference cancellation in a wireless communication system.

II. Background

A wireless multiple-access communication system can concurrently communicate with multiple wireless devices, e.g., cellular phones. Examples of such multiple-access systems include Code Division Multiple Access (CDMA) systems, Time Division Multiple Access (TDMA) systems, and Frequency Division Multiple Access (FDMA) systems.

A wireless multiple-access system typically includes many base stations that provide communication coverage for a large geographic area. Each base station may transmit data to one or more wireless devices located within its coverage area at any given moment. A given wireless device may receive a desired transmission from a serving base station as well as interfering transmissions from nearby base stations. These interfering transmissions are intended for other wireless devices located within the coverage areas of these nearby base stations but act as interference to this given wireless device. The interference hinders the wireless device's ability to demodulate the desired transmission and has a large impact on performance.

There is therefore a need in the art for techniques to demodulate a desired transmission in the presence of interfering transmissions in a wireless communication system.

SUMMARY

Techniques for performing interference cancellation in a wireless communication system (e.g., a CDMA system) are described herein. As used herein, "cancellation" and "suppression" are synonymous terms and are used interchangeably. The techniques perform interference cancellation based on per-bin power estimates for multiple orthogonal bins, e.g., Walsh bins.

In an aspect, the per-bin power estimates are derived by estimating at least two components of these power estimates. The components may include, e.g., channel gain, noise and interference, and bin gain. In an embodiment, initial power estimates $\hat{\lambda}_{l,n}$ are derived for the orthogonal bins, e.g., based on received symbols for these bins. A noise and interference estimate $\hat{\sigma}_I^2$ may then be derived based on (1) an initial power estimate for a null bin with no transmission or (2) the smallest initial power estimate for all bins. A bin gain estimate $\hat{g}_{l,n}$ may be derived for each orthogonal bin based on the initial power estimate $\hat{\lambda}_{l,n}$ for that bin and a pilot power estimate. A channel gain estimate $\hat{h}_l$ may be derived based on a received pilot. The various estimates may be derived with filters having time constants selected to provide good estimation performance. The power estimate $\hat{\lambda}_{l,n}$ for each orthogonal bin may then be derived based on the channel gain estimate $\hat{h}_l$, the noise and interference estimate $\hat{\sigma}_I^2$, and the bin gain estimate $\hat{g}_{l,n}$ for that bin. Interference cancellation is performed using the power estimates for the orthogonal bins, as described below.

In another aspect, interference cancellation is performed in multiple stages with fast tracking. A total power estimate $\hat{S}_{l,1}$ and per-bin power estimates $\hat{\Lambda}_{l,1}$ for multiple orthogonal bins are derived for a first stage, e.g., based on the received symbols for this stage. A fast filter may be used for the total power estimate, and a slower filter may be used for the per-bin power estimates. Interference cancellation is performed for the first stage based on the per-bin power estimates $\hat{\Lambda}_{l,1}$ for this stage. A total power estimate $\hat{S}_{l,2}$ is derived for a second stage, e.g., based on the received symbols for this stage. Per-bin power estimates $\hat{\Lambda}_{l,2}$ are derived for the second stage based on the total power estimates $\hat{S}_{l,1}$ and $\hat{S}_{l,2}$ for the first and second stages, respectively, and the per-bin power estimates $\hat{\Lambda}_{l,1}$ for the first stage. Interference cancellation is performed for the second stage based on the per-bin power estimates $\hat{\Lambda}_{l,2}$ for this stage.

Various aspects and embodiments of the invention are described in further detail below.

DETAILED DESCRIPTION

The interference cancellation techniques described herein may be used for various communication systems such as CDMA, TDMA, FDMA, Orthogonal FDMA (OFDMA), and Single-Carrier FDMA (SC-FDMA) systems. A CDMA system may implement one or more CDMA Radio Access Technologies (RATs) such as cdma2000, Wideband-CDNM (W-CDNM), and so on. cdma2000 covers IS-2000, IS-856, and IS-95 standards. A TDMA system may implement a RAT such as GSM. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM to transmit symbols in the frequency domain on orthogonal subcarriers. An SC- FDMA system transmits symbols in the time domain on orthogonal subcarriers. For clarity, the techniques are described below for a CDMA system, which may be a cdma2000 system or a W-CDMA system.

Figure 1:
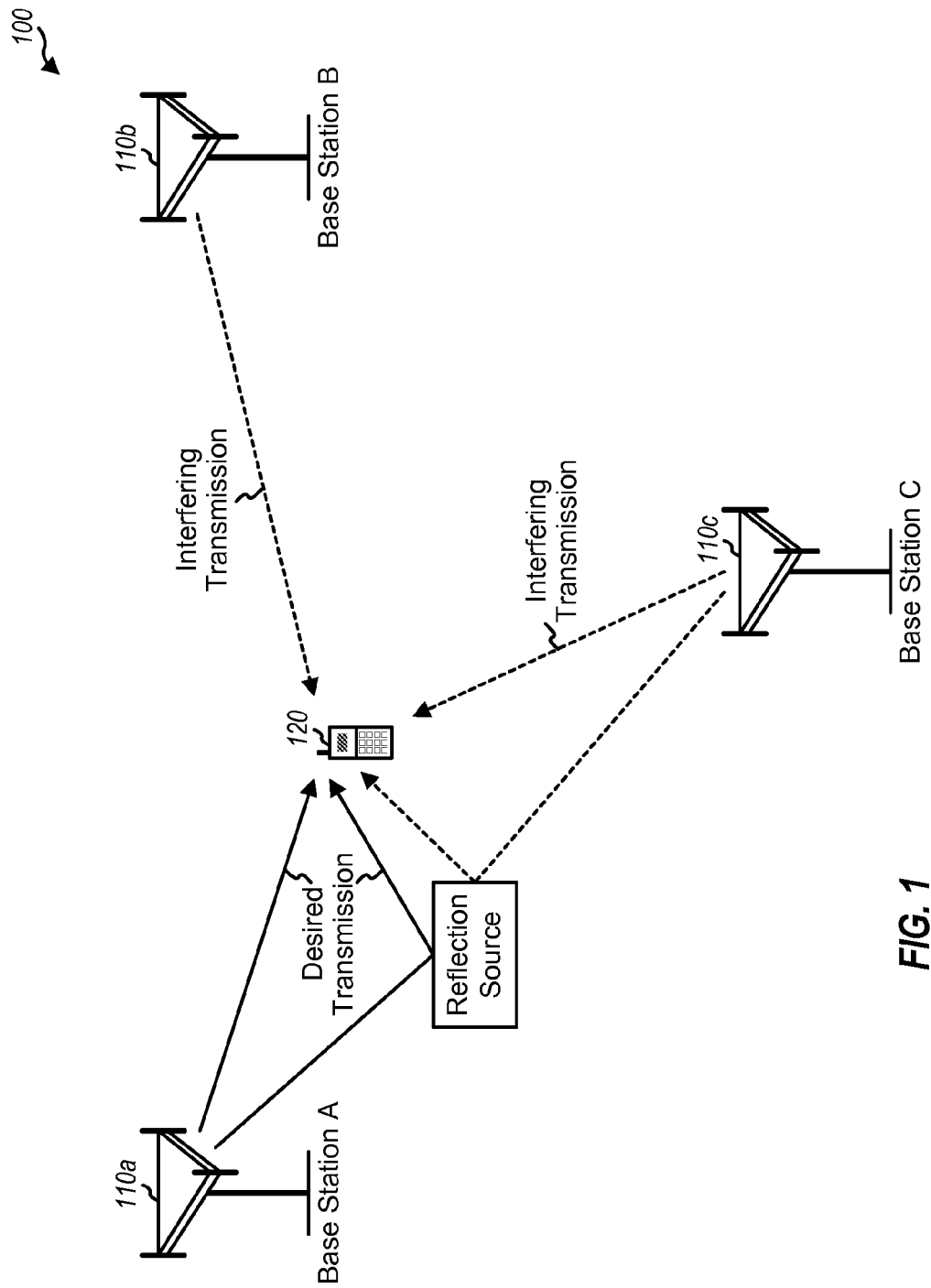
FIG. 1 shows a CDMA system with multiple base stations.

FIG. 1 shows a CDMA system 100 with multiple base stations. For simplicity, FIG. 1 shows only three base stations 110a, 110b and 110c and one wireless device 120. A base station is generally a fixed station that communicates with the wireless devices and may also be called a Node B (3GPP terminology), an access point, and so on. Each base station 110 provides communication coverage for a particular geographic area. The term "cell" can refer to a base station and/or its coverage area depending on the context in which the term is used. To improve system capacity, the base station coverage area may be partitioned into multiple (e.g., three) smaller areas. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The following description assumes that each cell is partitioned into multiple sectors. For simplicity, the term "base station" generically refers to a fixed station for a cell as well as a fixed station for a sector. A serving base station/sector is a base station/sector with which a wireless device communicates.

A wireless device may be fixed or mobile and may also be called a user equipment (UE) (3GPP terminology), a mobile station (cdma2000 terminology), a user terminal, and so on. A wireless device may be a cellular phone, a personal digital assistant (PDA), a wireless modem card, and so on. A wireless device may communicate with zero, one, or multiple base stations on the forward and reverse links at any given moment. The forward link (or downlink) refers to the communication link from the base stations to the wireless devices, and the reverse link (or uplink) refers to the communication link from the wireless devices to the base stations. For simplicity, FIG. 1 shows only transmissions on the forward link. Wireless device 120 receives a desired transmission from serving base station 110a via line-of-sight and reflected paths and also receives interfering transmissions from neighbor base stations 110b and 110c via line-of-sight and reflected paths.

Figure 2:
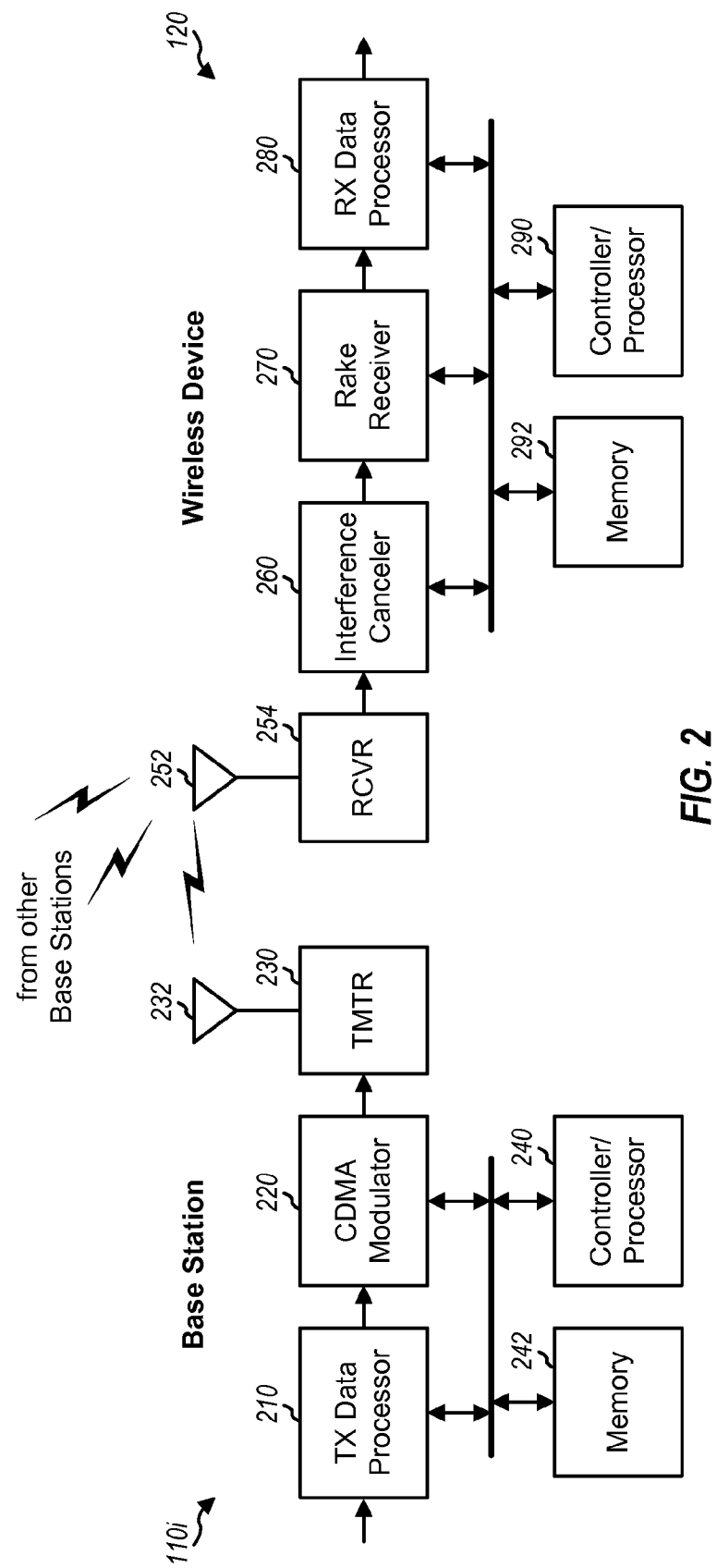
FIG. 2 shows a block diagram of a base station and a wireless device.

FIG. 2 shows a block diagram of a base station 110i and wireless device 120. Base station 110i may be any one of the base stations shown in FIG. 1. For simplicity, FIG. 2 shows base station 110i having one transmit antenna and wireless device 120 having one receive antenna. In general, base station 110i and wireless device 120 may each be equipped with any number of antennas. For simplicity, FIG. 2 shows only the processing units for data transmission on the forward link.

At base station 110i, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK or M-QAM), a symbol is generally a complex value, and pilot is data that is known a priori by both the base stations and the wireless devices. CDMA modulator 220 processes the data symbols and pilot symbols as described below and provides a stream of output chips to a transmitter (TMTR) 230. Transmitter 230 processes (e.g., converts to analog, amplifies, filters, and frequency upconverts) the output chip stream and generates a forward link signal, which is transmitted from an antenna 232.

At wireless device 120, an antenna 252 receives the forward link signals transmitted by base station 110i as well as other base stations. Antenna 252 provides a received signal to a receiver (RCVR) 254. Receiver 254 processes (e.g., filters, amplifies, frequency downconverts, and digitizes) the received signal and provides received samples to an interference canceller 260. Interference canceller 260 suppresses the interference from interfering base stations as described below and provides interference-canceled samples for the serving base station to a rake receiver 270. Antenna 252 may receive the forward link signal from the serving base station via one or more signal paths as shown in FIG. 1, and the received signal may include one or more signal instances (or multipaths) for the serving base station. Rake receiver 270 processes all multipaths of interest and provides data symbol estimates, which are estimates of the data symbols sent by the serving base station. Rake receiver 270 may also be replaced with an equalizer or some other types of receiver. A receive (RX) data processor 280 processes (e.g., symbol demaps, deinterleaves, and decodes) the data symbol estimates and provides decoded data. In general, the processing by rake receiver 270 and RX data processor 280 is complementary to the processing by CDMA modulator 220 and TX data processor 210, respectively, at base station 110i.

Controllers/processors 240 and 290 direct operation at base station 110i and wireless device 120, respectively. Memories 242 and 292 store data and program codes for base station 110i and wireless device 120, respectively.

For CDMA, multiple orthogonal channels may be obtained with different orthogonal codes. For example, multiple orthogonal traffic channels are obtained with different Walsh codes in cdma2000, and multiple orthogonal physical channels are obtained with different orthogonal variable spreading factor (OVSF) codes in W-CDMA. The orthogonal channels may be used to send different types of data (e.g., traffic data, broadcast data, control data, pilot, and so on) and/or traffic data for different wireless devices. The orthogonal channels are appropriately scaled, combined, and spectrally spread across the entire system bandwidth. The spectral spreading is performed with a spreading code, which is a pseudo-random number (PN) sequence in cdma2000 and a scrambling code in W-CDMA. In cdma2000, the channelization with Walsh codes is called "covering", and the spectral spreading is called "spreading". In W-CDMA, the channelization with OVSF codes is called "spreading", and the spectral spreading is called "scrambling". For clarity, cdma2000 terminology (e.g., traffic channel, covering, spreading, and so on) is used in the following description.

Figure 3:
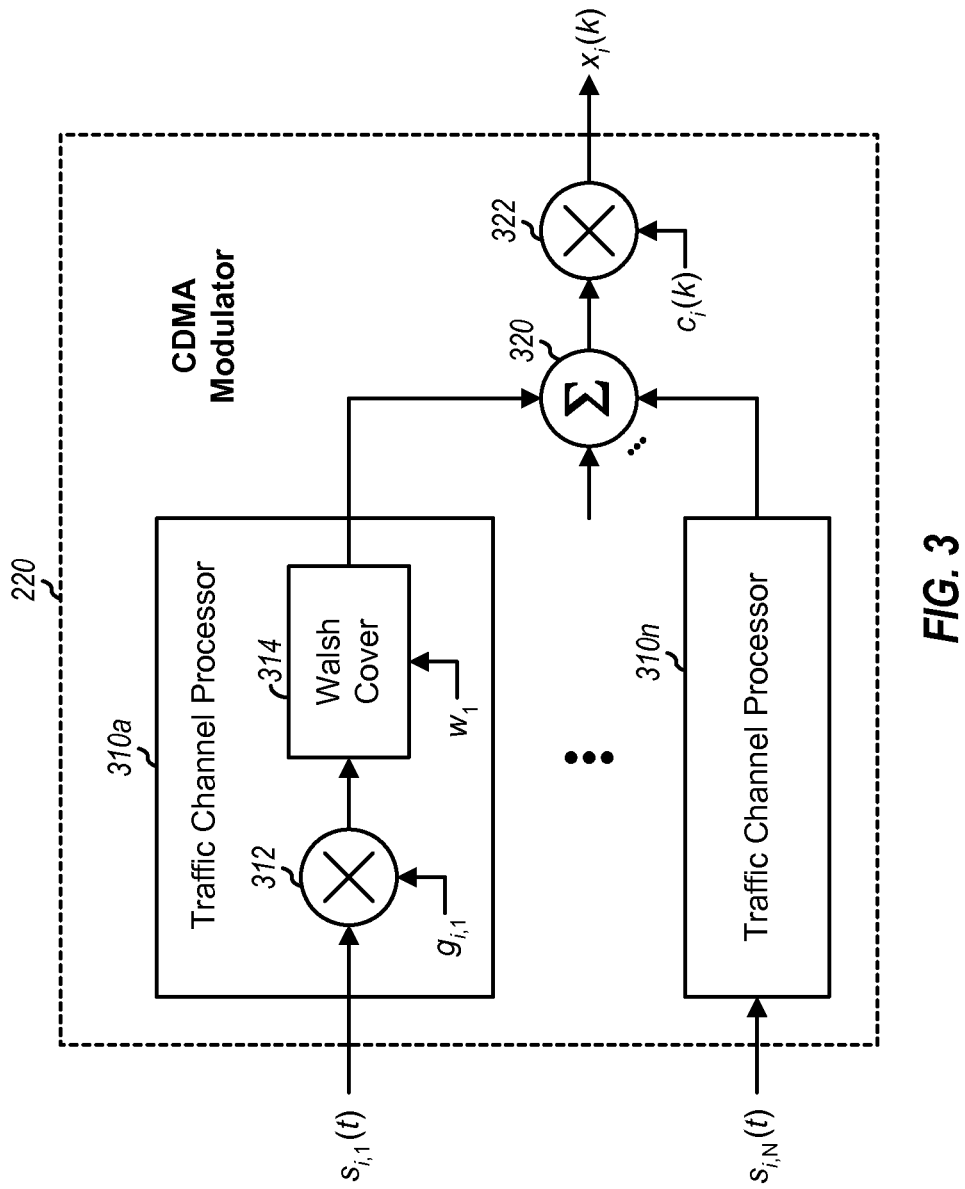
FIG. 3 shows a CDMA modulator at the base station.

FIG. 3 shows a block diagram of CDMA modulator 220 within base station 110i. For simplicity, the following description assumes that N traffic channels are available for each sector, and each traffic channel is assigned a different Walsh code of length N, where N may be equal to 4, 8, 16, 32, 64 or 128 for cdma2000. In general, orthogonal codes of different lengths may be used for the traffic channels, and N may correspond to the length of the longest orthogonal code.

CDMA modulator 220 includes N traffic channel processors 310a through 310n for the N traffic channels. Within each traffic channel processor 310, a multiplier 312 receives and scales the data symbols for traffic channel n with a gain $g_{i,n}$ for traffic channel n and provides scaled data symbols. The gain $g_{i,n}$ may be set to zero if traffic channel n is not used. A Walsh cover unit 314 channelizes the scaled data symbols with a Walsh code $w_n$ assigned to traffic channel n. Unit 314 performs covering by repeating each scaled data symbol multiple times to generate N replicated symbols and then multiplying the N replicated symbols with the N chips of Walsh code $w_n$ to generate N data chips for that data symbol. A combiner 320 receives and adds the data chips for all N traffic channels. A multiplier 322 multiplies the combined data chips with a spreading code assigned to sector i and generates output chips.

The output chips for sector i may be expressed in discrete time, as follows:

$$x_i(k) = \sum_{n=1}^{N} c_i(k) \cdot w_n(\mathrm{mod}(k, N)) \cdot g_{i,n} \cdot s_{i,n}(\lfloor k/N \rfloor), \quad \text{Eq (1)}$$

where k is an index for chip period,
n is an index for traffic channel,
i is an index for sector,
$s_{i,n}(\lfloor k/N \rfloor)$ is a data symbol sent on traffic channel n in chip period k,
$w_n(\mathrm{mod}(k,N))$ is a Walsh chip for traffic channel n in chip period k,
$g_{i,n}$ is the gain for traffic channel n in sector i,
$c_i(k)$ is a spreading code chip for sector i in chip period k, and
$x_i(k)$ is an output chip for sector i in chip period k.

Each data symbol is sent in N chip periods. Data symbol $s_{i,n}(t)$ for symbol period t is sent in chip periods k=N·t through N·t+N−1. Hence, t=$\lfloor k/N \rfloor$ and $s_{i,n}(t)=s_{i,n}(\lfloor k/N \rfloor)$, where "$\lfloor x \rfloor$" denotes a floor operator. For simplicity, the data symbols, Walsh chips, and spreading code chips are assumed to have unit magnitude for all chip periods k, symbol periods t, traffic channels n, and sector i, or $|s_{i,n}(t)|=|w_n(\mathrm{mod}(k,N))|=|c_i(k)|=1$ for $\forall k,t,n,i$. The spreading codes for different sectors are uncorrelated, with $E\{c_i(k) \cdot c_j^*(k+\kappa)\}=\delta(\kappa) \cdot \delta(i,j)$, which means that the expected value between the spreading codes for sectors i and j is equal to one only if $\kappa$=0 and i=j. Different sectors are assigned different shifted versions of the same PN sequence in cdma2000, in which case the spreading codes for different sectors are uncorrelated over a range of chip offsets.

Equation (1) may be expressed in matrix form, as follows:

$$\underline{x}_i(t) = \underline{C}_i(t) \cdot \underline{W} \cdot \underline{G}_i \cdot \underline{s}_i(t), \quad \text{Eq (2)}$$

where $\underline{s}_i(t) = [s_{i,1}(t)\ s_{i,2}(t)\ \ldots\ s_{i,N}(t)]^T$ is an N×1 vector containing N data symbols to be sent on the N traffic channels in symbol period t,
$\underline{G}_i$ is an N×N diagonal matrix containing the gains for the N traffic channels along the diagonal, or diag $(\underline{G}_i)=\{g_{i,1}, g_{i,2}, \ldots, g_{i,N}\}$,
$\underline{W}$ is an N×N Walsh matrix containing N Walsh codes in N columns,
$\underline{C}_i(t)$ is an N×N diagonal matrix containing N spreading code chips along the diagonal for N chip periods in symbol period t, or diag $(\underline{C}_i(t))=\{c_i(N \cdot t), c_i(N \cdot t+1), \ldots, c_i(N \cdot t+N-1)\}$,
$\underline{x}_i(t) = [x_i(N \cdot t) x_i(N \cdot t+1) \ldots x_i(N \cdot t+N-1)]^T$ is an N×1 vector containing N output chips for sector i in symbol period t, and
"$T$" denotes a transpose.

A diagonal matrix contains possible non-zero values along the diagonal and zeros elsewhere. If the traffic channels have different Walsh code lengths, then N is equal to the longest Walsh code length for all traffic channels, and each shorter Walsh code is repeated in matrix $\underline{W}$.

Wireless device 120 receives the forward link signals from base station 110i and other base stations. The received samples from receiver 254 may be expressed as:

$$\underline{r}(t) = \sum_i h_i \cdot \underline{x}_i(t) + \underline{n}(t), \quad \text{Eq (3)}$$

where $h_i$ is a channel gain for sector i,
$\underline{n}(t)$ is an N×1 vector of noise and interference not included in $\underline{x}_i(t)$, and
$\underline{s}(t)$ is an N×1 vector containing N received samples for symbol period t.

Equation (3) assumes that all sectors are synchronized and that there is a single signal path (or no multipath) for each sector. For simplicity, the noise and interference in s(t) may be assumed to be additive white Gaussian noise (AWGN) with a zero mean vector and a covariance matrix of $N_0 \cdot \underline{I}$, where $N_0$ is the variance of the noise and interference, and $\underline{I}$ is the identity matrix with ones along the diagonal and zeros elsewhere.

In equation (3), r(t) is a received vector for one symbol period. The received vectors for different symbol periods are uncorrelated due to the use of spreading codes that are temporally uncorrelated. Hence, there is no dependence across different symbol periods. For clarity, symbol index t is omitted in much of the description below.

Wireless device 120 may derive estimates of the data symbols transmitted by a given sector j on traffic channel n by (1) despreading the received samples with the spreading code used by sector j and (2) decovering the despread samples with the Walsh code for traffic channel n, as follows:

$$\check{s}_{j,n} = \underline{w}_n^T \cdot \underline{C}_j^H \cdot \underline{r}, \quad \text{Eq (4)}$$

where $\underline{C}_j$ is an N×N diagonal matrix containing the spreading code chips for sector j,
$\underline{w}_n$ is an N×1 vector containing the Walsh code for the desired traffic channel n,
$s_{j,n}$ is a data symbol sent by sector j on traffic channel n,
$\check{s}_{j,n}$ is an estimate of $s_{j,n}$ without interference cancellation, and
"$H$" denotes a conjugate transpose.

To cancel the interference from an interfering sector l, wireless device 120 may despread the received samples with the spreading code used by sector l and then decover the despread samples, as follows:

$$\underline{u}_l = \underline{W}^T \cdot \underline{C}_l^H \cdot \underline{r}, \quad \text{Eq (5)}$$

where $\underline{u}_l$ is an N×1 vector containing N received symbols for N Walsh bins for sector l. The multiplication by $\underline{C}_l^H$ despreads the received samples for sector l. The multiplication by $\underline{W}^T$ generates the received symbols for the N Walsh bins. The N Walsh bins are for N traffic channels if these traffic channels are assigned N different Walsh codes of length N. The N Walsh bins may be viewed as corresponding to N orthogonal channels obtained via the decovering with $\underline{W}^T$.

A covariance matrix $\underline{\Lambda}_l$ for vector $\underline{u}_l$ may be expressed as:

$$\underline{\Lambda}_\ell = E\{\underline{u}_\ell \cdot \underline{u}_\ell^H\}, \quad \text{Eq (6)}$$

$$= N^2 \cdot |h_\ell|^2 \cdot \underline{G}_\ell^2 + N \cdot \left( \sum_{i \neq \ell} \sum_{n=1}^{N} |h_i|^2 \cdot g_{i,n}^2 + N_0 \right) \cdot \underline{I},$$

$$= q_\ell \cdot \underline{G}_\ell^2 + N \cdot \sigma_\ell^2 \cdot \underline{I},$$

where $q_l = N^2 \cdot |h_l|^2$ is a channel power gain for sector l, and $$\sigma_\ell^2 = \sum_{i \neq \ell}\sum_{n=1}^{N} |h_i|^2 \cdot g_{i,n}^2 + N_0$$

is the noise and interference from other sectors.

The covariance matrix $\Lambda_l$ may be given as diag $(\Lambda_l) = \{\lambda_{l,1}, \lambda_{l,2}, \ldots, \lambda_{l,N}\}$. The diagonal elements of $\Lambda_l$ are measured powers (or eigenvalues) for the N Walsh bins. $\Lambda_l$ is equi-diagonal if all N diagonal elements are equal, or $\lambda_{l,n} = \lambda_l$ for $\forall n$.

Wireless device 120 may derive symbol estimates for traffic channel n of sector j based on various techniques such as a linear minimum mean square error (LMMSE) technique, a least squares (LS) technique, and so on. Symbol estimates for traffic channel n of sector j may be derived based on the LMMSE technique, as follows:

$$\hat{s}_{j,n} = E\left(s_{j,n}^* \cdot \underline{u}_\ell \mid \underline{C}_j, \underline{C}_\ell\right)^H \cdot \Delta_\ell^{-1} \cdot \underline{u}_\ell, \quad \text{Eq (7)}$$

$$= E\left(s_{j,n}^* \cdot \left(\underline{W}^T \cdot \underline{C}_\ell^H \sum_i h_i \cdot \underline{C}_i \cdot \underline{W} \cdot \underline{G}_i \cdot \underline{s}_i + \underline{W}^T \cdot \underline{C}_\ell^H \cdot \underline{n}\right) \middle| \underline{C}_j, \underline{C}_\ell\right)^H \cdot \Delta_\ell^{-1} \cdot \underline{u}_\ell,$$

$$= h_j^* \cdot g_{j,n} \cdot \underline{w}_n^T \cdot \underline{C}_j^H \cdot \underline{C}_\ell \cdot \underline{W} \cdot \Lambda_\ell^{-1} \cdot \underline{u}_\ell,$$

where $\hat{s}_{j,n}$ is an LMMSE estimate of $s_{j,n}$.

The LMMSE symbol estimation in equation (7) may be combined with equation (5) and then broken into smaller equations, as follows:

$$\underline{r}_\ell = \frac{1}{tr(\Delta_\ell^{-1})} \cdot \underline{C}_\ell \cdot \underline{W} \cdot \Delta_\ell^{-1} \cdot \underline{W}^T \cdot \underline{C}_\ell^H \cdot \underline{r}, \quad \text{Eq (8)}$$

$$\check{s}_{j,n} = \underline{w}_n^T \cdot \underline{C}_j^H \cdot \underline{r}_\ell, \text{ and} \quad \text{Eq (9)}$$

$$\hat{s}_{j,n} = h_j^* \cdot g_{j,n} \cdot tr(\Delta_\ell^{-1}) \cdot \check{s}_{j,n}, \quad \text{Eq (10)}$$

where $\underline{r}_l$ is an N×1 vector containing N interference-canceled samples having the signal component for sector l suppressed, $\Lambda_l^{-1}$ is an N×N diagonal matrix given as diag($\Lambda_l^{-1}$) = $\{\lambda_{l,1}^{-1}, \lambda_{l,2}^{-1}, \ldots, \lambda_{l,N}^{-1}\}$, $tr(\Lambda_l^{-1})$ is the trace of $\Lambda_l^{-1}$, which is the sum the diagonal elements of $\Lambda_l^{-1}$, $\check{s}_{j,n}$ is an unweighted LMMSE estimate of $s_{j,n}$, and $\hat{s}_{j,n}$ is a weighted LMMSE estimate of $s_{j,n}$.

Equation (8) represents interference cancellation for one interfering sector l. In the description herein, the interference cancellation in equation (8) is referred to as quasi-linear interference cancellation (QLIC). Vector $\underline{r}_l$ contains samples having the interference from sector l suppressed. Equation (9) indicates that the remaining LMMSE symbol estimation for $s_{j,n}$ includes simple despread and decover operations that are conventionally done by a CDMA receiver, as shown in equation (4). In particular, vector $\underline{r}_l$ is despread with the spreading code for the desired sector j and then decovered with the Walsh code for the desired traffic channel n. Equation (10) shows the LMMSE scaling to obtain the weighted estimate for subsequent decoding.

As shown in equation (6), the diagonal elements of $\Lambda_l$ are determined in part by the gain matrix $G_l$ for interfering sector l. If the gains for all N traffic channels of sector l are equal (i.e., $g_{l,n} = g_l$ for $\forall n$), then $G_l = g_l \cdot I$ and $\Lambda_l = \eta \cdot I$, where $\eta$ is an overall power gain given as $\eta = N/tr(\Lambda_l^{-1})$. The scaling by $1/tr(\Lambda_l^{-1})$ results in $\underline{r}_l$ being equal to $\underline{r}$ if $\Lambda_l$ is equi-diagonal and contains $\eta$ along the diagonal. In this case, the unweighted symbol estimate $\hat{s}_{j,n}$ from equation (9) is equal to the symbol estimate $\check{s}_{j,n}$ from equation (4) without interference cancellation. Interference cancellation is achieved when the gains in matrix $G_l$ are not equal, so that traffic channels with larger gains are attenuated more by the multiplication with the inverted covariance matrix $\Lambda_l^{-1}$ in equation (8). In effect, equation (8) applies a normalized Walsh bin scaling of $\Lambda_l^{-1}/tr(\Lambda_l^{-1})$, which achieves relative adjustment for interference suppression while providing unity overall gain on average over the N Walsh bins.

Figure 4:
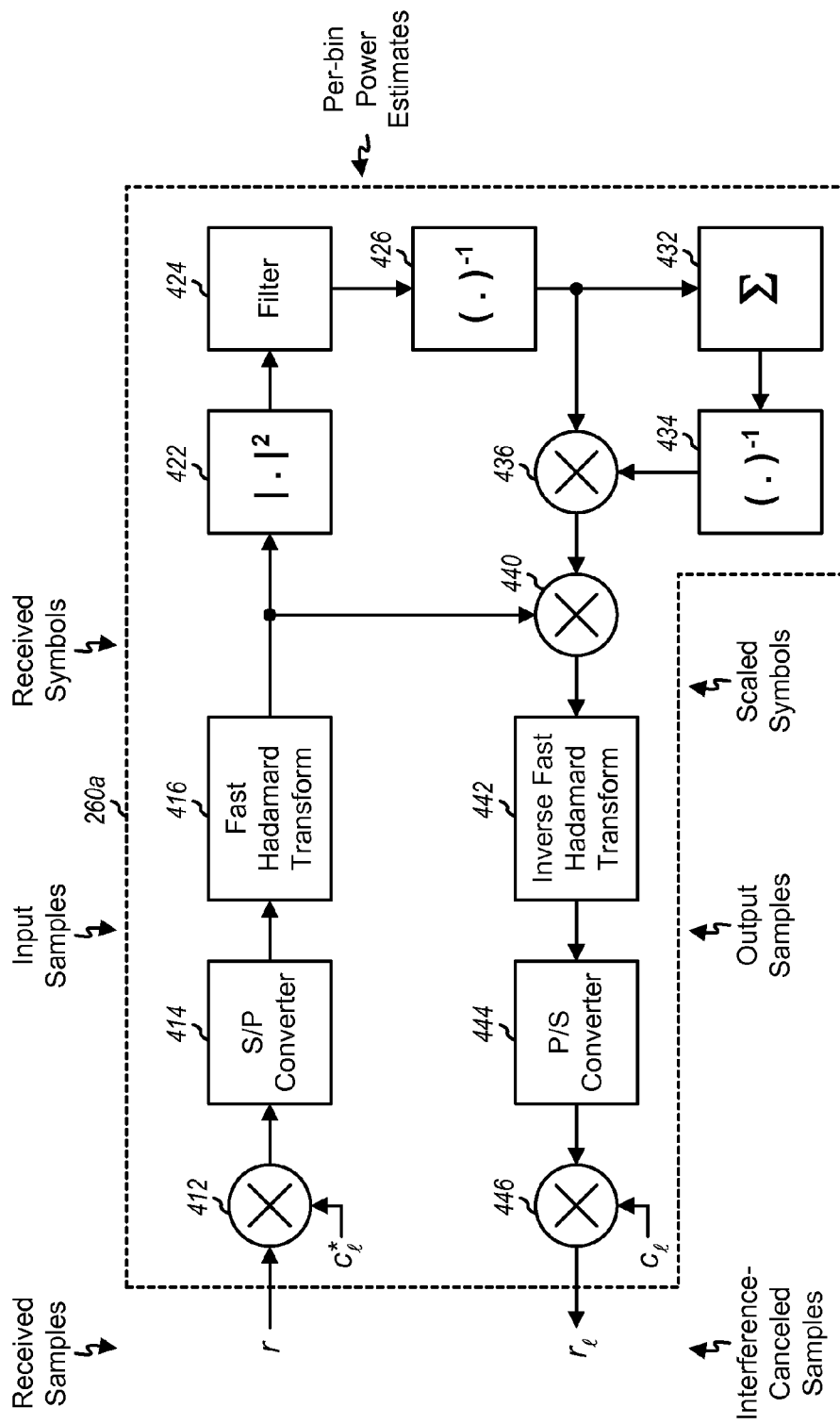
FIG. 4 shows a single-sector interference canceller.

FIG. 4 shows a block diagram of a single-sector interference canceller 260a, which is an embodiment of interference canceller 260 in FIG. 2. Within interference canceller 260a, a multiplier 412 multiplies the received samples r with a complex-conjugated spreading code $c^*_l$ for sector l and provides input samples. A serial-to-parallel (S/P) converter 414 forms a vector of N input samples for each symbol period and provides the N input samples in parallel. A fast Hadamard transform (FHT) unit 416 performs an N-point FHT on the N input samples for each symbol period and provides N received symbols for N Walsh bins.

A unit 422 computes the squared magnitude of the received symbol for each Walsh bin and provides a power value for that Walsh bin. A filter 424 averages the power values from multiple symbol periods for each Walsh bin and provides a power estimate $\hat{\lambda}_{l,n}$ for that Walsh bin. Filter 424 provides estimates of the diagonal elements of $\Lambda_l$. Filter 424 may be implemented with a finite impulse response (FIR) filter, an infinite impulse response (IIR) filter, or some other type of filter. Filter 424 may have a time constant that is selected as described below. A unit 426 computes the inverse of the power estimate for each Walsh bin and provides N inverse power estimates, which are estimates of the diagonal elements of $\Lambda_l^{-1}$. A summer 432 sums the N inverse power estimates and computes the trace of $\Lambda_l^{-1}$. A unit 434 computes the inverse of the trace of $\Lambda_l^{-1}$ and provides the scaling factor $1/tr(\Lambda_l^{-1})$. A multiplier 436 multiplies each of the N inverse power estimates from unit 426 with the scaling factor $1/tr(\Lambda_l^{-1})$ and provides N normalized inverse power estimates for the N Walsh bins. Multiplier 436 may also be located after multiplier 446, as indicated by equation (8).

A multiplier 440 obtains N received symbols for the N Walsh bins in each symbol period, multiplies the received symbol for each Walsh bin with the normalized inverse power estimate for that Walsh bin, and provides N scaled symbols for the N Walsh bins. Units 422 through 440 perform processing on a per Walsh bin basis. An inverse FHT (IFHT) unit 442 performs an N-point IFHT on the N scaled symbols for each symbol period and provides N output samples for that symbol period. A parallel-to-serial (P/S) converter 444 serializes the N output samples for each symbol period. A multiplier 446 multiplies the output samples with the spreading code for sector l and provides the interference-canceled samples $\underline{r}_l$ for sector l.

In FIG. 4, multiplier 412 performs despreading for sector l, which is multiplication with $C_l^H$ in equation (8). Serial-to-parallel converter 414 vectorizes the input samples for each symbol period. FHT unit 416 performs decovering for the N traffic channels, which is multiplication with $W^T$ in equation (8). FHT unit 416 efficiently projects the vectorized samples into orthogonal bins using Walsh codes and diagonalizes the covariance matrix $\Lambda_l$. Multiplier 412, converter 414, and FHT unit 416 implement equation (5) and provide $\underline{u}_l$. Unit 422, filter 424, and unit 426 derive an estimate of $\Lambda_l^{-1}$. Summer 432 and unit 434 compute the scaling factor $1/\text{tr}(\Lambda_l^{-1})$. Multiplier 436 normalizes the inverses of the power estimates, which is multiplication with $1/\text{tr}(\Lambda_l^{-1})$ in equation (8). Multiplier 440 scales the N Walsh bins based on the normalized inverse power estimates for these Walsh bins, which is multiplication with $\Lambda_l^{-1}$ in equation (8). Hence, Walsh bins with larger powers are attenuated more, which reduces the interference contributions from these Walsh bins. IFHT unit 442 performs covering for the N Walsh bins, which is multiplication with $\underline{W}$ in equation (8). Multiplier 446 performs spreading (or respreading) for sector l, which is multiplication with $\underline{C}_l$ in equation (8).

The interference cancellation is performed based on covariance matrix $\Lambda_l$, which has the form shown in equation (6). Interference cancellation performance is dependent on the ability to accurately estimate $\Lambda_l$. In the context of interference cancellation, tracking refers to the ability to accurately estimate matrix $\Lambda_l$ under varying operating environment.

Matrix $\Lambda_l$ may be estimated in various manners. In an embodiment that is shown in FIG. 4, matrix $\Lambda_l$ is estimated by averaging the power values for the received symbols in vector $\underline{u}_l$ across multiple symbol periods. In this embodiment, filter 424 may be designed to provide suitable averaging for the expected operating environment. In another embodiment that is described below, matrix $\Lambda_l$ is estimated based on components of $\Lambda_l$.

From equation (6), the diagonal elements of $\Lambda_l$ may be expressed as:

$$\lambda_{l,n} = N^2 \cdot |h_l|^2 \cdot g_{l,n}^2 + N \cdot \sigma_l^2, \text{ for } n=1, \ldots, N. \quad \text{Eq (11)}$$

Equation (11) indicates that the power $\lambda_{l,n}$ of Walsh bin n for sector l is determined by the channel gain $h_l$ for sector l, the gain $g_{l,n}$ for traffic channel n in sector l, and the noise and interference $\sigma_l^2$ for sector l. Gain $g_{l,n}$ is also referred to as the bin gain for Walsh bin n. The channel gain $h_l$ and the noise and interference $\sigma_l^2$ are common for all N Walsh bins. The channel gain $h_l$ may be estimated based on a pilot transmitted by sector l using any channel estimation scheme known in the art. The channel gain estimate for sector l is denoted as $\hat{h}_l$.

In an embodiment, the noise and interference $\sigma_l^2$ for sector l is estimated based on a power estimate for a Walsh bin corresponding to an unused traffic channel. An unused traffic channel has a gain of zero, or $g_{l,n}=0$. In this case, the power of the corresponding null Walsh bin contains only the noise and interference, or $\lambda_{l,null} = N \cdot \sigma_l^2$, where $\lambda_{l,null}$ is the power of the null Walsh bin. The noise and interference estimate may be set equal to the power estimate for the null Walsh bin, as follows:

$$N \cdot \hat{\sigma}_l^2 = \hat{\lambda}_{l,null}, \quad \text{Eq (12)}$$

where $\hat{\lambda}_{l,null}$ is an estimate of $\lambda_{l,null}$ (e.g., from filter 424 in FIG. 4) and $\hat{\sigma}_l^2$ is an estimate of $\sigma_l^2$. An unused traffic channel may be identified based on signaling from a sector, the structure of the traffic channels, and so on. For example, if the processing for interference cancellation is performed in intervals of multiple symbols (e.g., 2N or 4N) and if the pilot is transmitted with a Walsh code of all zeros, then an unused traffic channel corresponding to a sub-branch of the pilot Walsh code may be used for noise and interference estimation.

In another embodiment, the noise and interference $\sigma_l^2$ for sector l is estimated based on the smallest power estimate for all Walsh bins for sector l, as follows:

$$N \cdot \hat{\sigma}_l^2 = \min_n \{\hat{\lambda}_{l,n}\}. \quad \text{Eq (13)}$$

The smallest power estimate may be assumed to be for an unused traffic channel. Since $\lambda_{l,n}$ is a random variable, setting $\hat{\sigma}_l^2$ to the smallest power estimate results in $\hat{\sigma}_l^2$ having a negative bias and under-estimating the noise and interference. A scaling factor may be used to account for the negative bias.

In yet another embodiment, the noise and interference $\sigma_l^2$ for sector l is estimated based on an average of a predetermined number of smallest power estimates for all Walsh bins for sector l. The noise and interference may also be estimated in other manners.

In an embodiment, the bin gain $g_{l,n}$ is estimated based on the power estimate for Walsh bin n and a pilot power estimate, as follows:

$$\hat{g}_{l,n}^2 = \frac{\hat{\lambda}_{l,n} - N \cdot \hat{\sigma}_l^2}{\hat{\lambda}_{l,pilot} - N \cdot \hat{\sigma}_l^2}, \quad \text{Eq (14)}$$

where $\hat{\lambda}_{l,n}$ is an estimate of the power of Walsh bin n,
$\hat{\lambda}_{l,pilot}$ is an estimate of the power of the Walsh bin for the pilot, and
$\hat{\lambda}_{l,n}$ is an estimate of bin gain $g_{l,n}$.

Equation (14) gives a bin gain estimate relative to (or normalized by) the pilot channel gain. For interference cancellation, it is sufficient to have the bin gain estimates be proportionally correct.

The channel gain estimate $\hat{h}_l$, the noise and interference estimate $\hat{\sigma}_l^2$, and the bin gain estimate $\hat{g}_{l,n}$ may be derived with filters selected to provide good estimation performance. Each component may be derived with a respective filter having a time constant that is selected to provide an accurate estimate for that component. In general, a longer time constant provides better averaging over random fluctuations of estimation errors but has poorer ability to track rapid changes in the environment. The converse is true for a shorter time constant. A shorter time constant may be used for the channel gain estimate $\hat{h}_l$ in order to accommodate fast fading. A longer time constant may be used for the bin gain estimate $\hat{g}_{l,n}$ and may be selected to track changes in traffic channel gain due to power control, which may be 0.5 decibel (dB) per 1.25 milliseconds (ms) in cdma2000. A shorter time constant may also be used for the noise and interference estimate $\hat{\sigma}_l^2$ in order to accommodate rapid changes in the channel gains $h_i$ for the other sectors due to fast fading. The time constants for the different components may be selected based on computer simulation, empirical measurements, and so on.

The elements of matrix $\Lambda_l$ may be derived based on the channel gain estimate, the noise and interference estimate, and the bin gain estimates, as follows:

$$\hat{\lambda}_{l,n} = N^2 \cdot |\hat{h}_l|^2 \cdot \hat{g}_{l,n}^2 + N \cdot \hat{\sigma}_l^2, \quad \text{Eq (15)}$$

where $\hat{\lambda}_{l,n}$ is an improved power estimate for Walsh bin n of sector l, which is derived based on estimates of the components of $\lambda_{l,n}$. A matrix $\hat{\Lambda}_l$ may be formed with the N power estimates $\hat{\lambda}_{l,n}$, for n=1, ..., N, for the N Walsh bins and may be used for interference cancellation.

Figure 5:
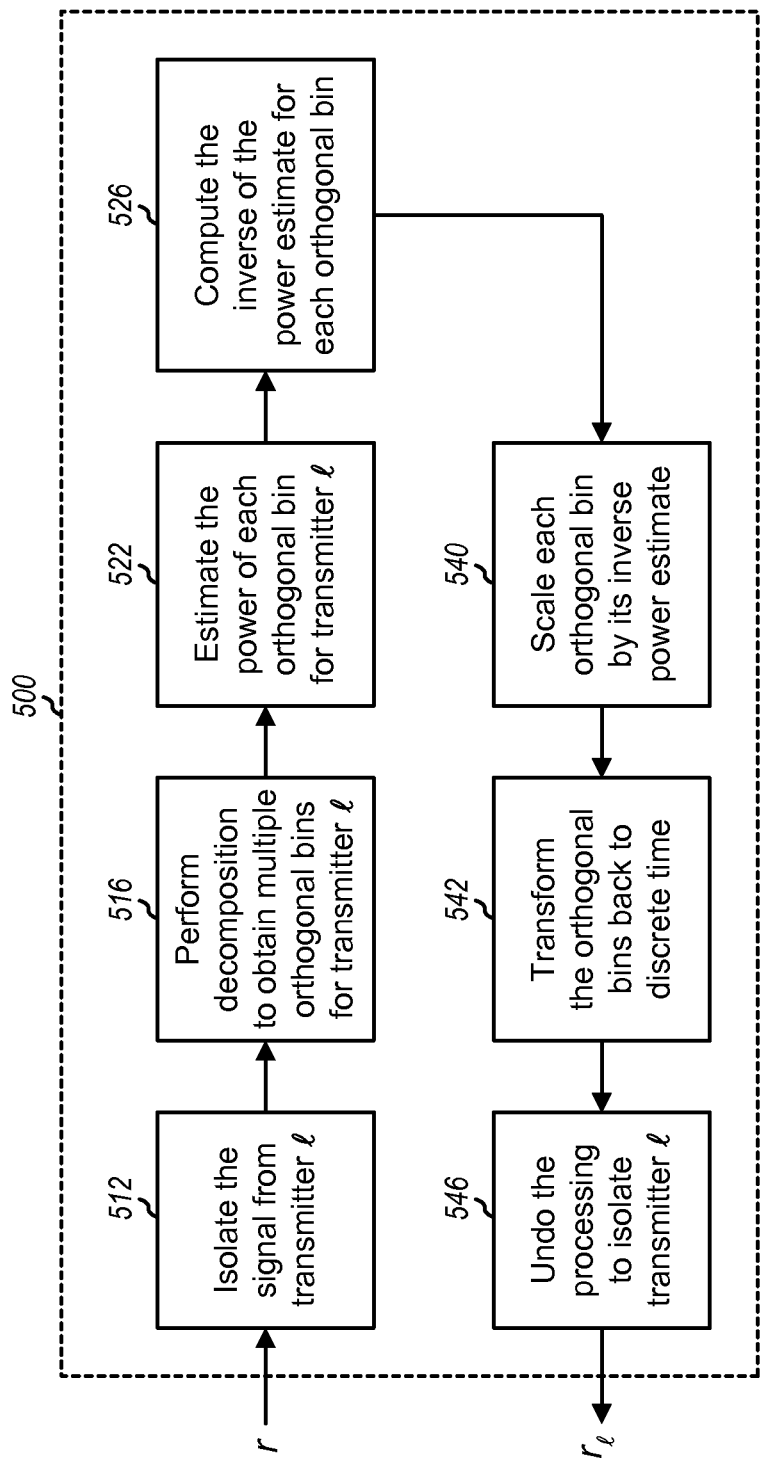
FIG. 5 shows a process for performing interference cancellation.

FIG. 5 shows an embodiment of a process 500 for performing interference cancellation. Time-domain receive samples (e.g., for CDMA) or frequency-domain received samples (e.g., for OFDM) are initially obtained. The received samples are processed to isolate the signal from an interfering transmitter l (block 512). The processing in block 512 may be an operation such as despreading for cdma2000, descrambling for W-CDMA, and so on. Decomposition is then performed to obtain multiple orthogonal bins for transmitter l (block 516). The orthogonal bins may also be referred to as orthogonal channels, Walsh bins, eigenmodes, modes, traffic channels, physical channels, and so on. Orthogonal bins are obtained for different Walsh codes in cdma2000 and for different OVSF codes in W-CDMA. The decomposition may be achieved with an FHT for cdma2000 and W-CDMA, a fast Fourier transform (FFT) for OFDM and FDMA systems, and with other types of transform for other systems.

Interference cancellation may be achieved by performing LMMSE scaling for each orthogonal bin. In this case, the power of each orthogonal bin for transmitter 1 is estimated (block 522). The inverse of the power estimate for each orthogonal bin is computed (block 526). Each orthogonal bin is then scaled by the inverse power estimate for that orthogonal bin, so that orthogonal bins with larger power estimates are attenuated more (block 540). The orthogonal bins are then transformed back to discrete time using the inverse of the transform used for decomposition (block 542). The processing to isolate transmitter 1 is then undone (block 546). The processing in block 546 may be an operation such as spreading for cdma2000, scrambling for W-CDMA, and so on.

Figure 6A:
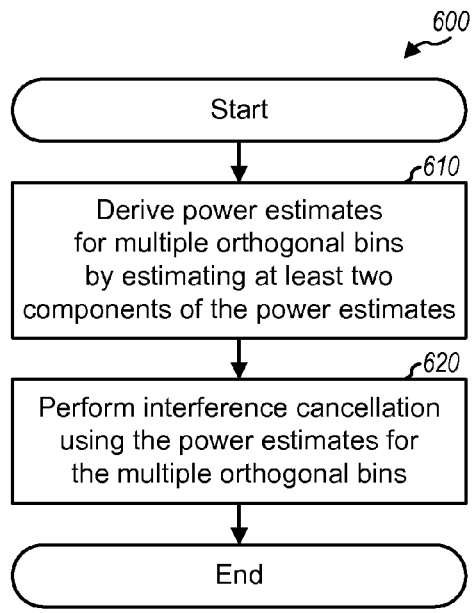
FIG. 6A shows another process for performing interference cancellation.

FIG. 6A shows an embodiment of a process 600 for performing interference cancellation. Power estimates for multiple orthogonal bins are derived by estimating at least two components of the power estimates, as described below (block 610). Interference cancellation is then performed using the power estimates for the multiple orthogonal bins (block 620). Block 610 may correspond to block 522 in FIG. 5, and block 620 may include the remaining blocks in FIG. 5.

Figure 6B:
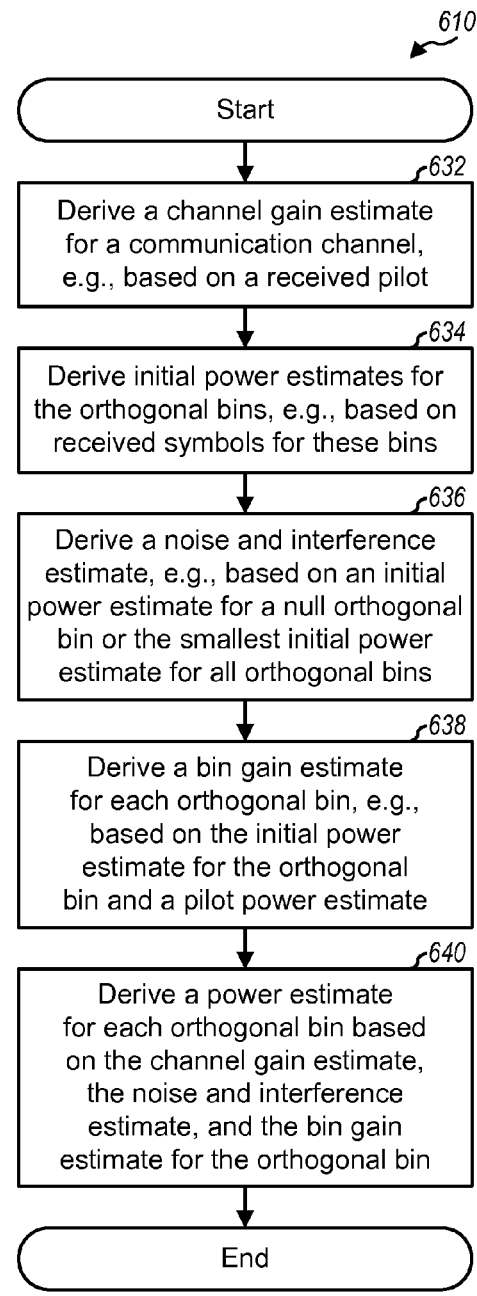
FIG. 6B shows a process for deriving power estimates.

FIG. 6B shows an embodiment of block 610 in FIG. 6A. A channel gain estimate $\hat{h}_l$ is derived for a communication channel, e.g., based on a received pilot (block 632). Initial power estimates $\hat{\lambda}_{l,n}$ are derived for the orthogonal bins, e.g., based on the received symbols for these bins (block 634). A noise and interference estimate $\hat{\sigma}_l^2$ may be derived based on the initial power estimate $\hat{\lambda}_{l,null}$ for a null orthogonal bin, the smallest initial power estimate for all orthogonal bins, and so on (block 636). A bin gain estimate $\hat{g}_{l,n}$ may be derived for each orthogonal bin, e.g., based on the initial power estimate $\hat{\lambda}_{l,n}$ for that orthogonal bin, a pilot power estimate $\hat{\lambda}_{l,pilot}$, and the noise and interference estimate $\hat{\sigma}_l^2$, as shown in equation (14) (block 638). Filters with the same or different time constants may be used for the three components $\hat{h}_l$, $\hat{\sigma}_l^2$ and $\hat{g}_{l,n}$. The channel gain estimate $\hat{h}_l$ and the noise and interference estimate $\hat{\sigma}_l^2$ are common for all orthogonal bins. A power estimate $\hat{\lambda}_{l,n}$ may then be derived for each orthogonal bin based on the channel gain estimate $\hat{h}_l$, the noise and interference estimate $\hat{\sigma}_l^2$, and the bin gain estimate $\hat{g}_{l,n}$ for that orthogonal bin, e.g., as shown in equation (15) (block 640).

In the embodiment shown in FIG. 6, the channel gain, the noise and interference, and the bin gains are three components that are estimated separately and then combined to derive the power estimates for the orthogonal bins. In other embodiments, other combination of components may be estimated separately and used to derive the power estimates. For example, the channel gain and the bin gains may be estimated together.

FIGS. 4 through 6B show interference cancellation for one interfering sector l. Interference from multiple sectors may also be estimated and canceled prior to demodulating a desired sector.

A cancellation term $e_l$ for each sector l may be defined as:

$$e_l = r - r_l.  \quad \text{Eq (16)}$$

Vector $e_l$ contains the signal component for sector l as well as distortion noise due to the $\sigma_l^2$ term in equation (6). Vector $e_l$ represents an interference component for other sectors and is equal to zero if $\Lambda_l$ is equi-diagonal. Vectors $e_l$ for different sectors are uncorrelated due to the use of different spreading codes by different sectors. Vector $e_l$ for an interfering sector l is also uncorrelated with transmitted vector $x_j$ for a desired sector j, again due to the use of different spreading codes. The scaling factor $1/\text{tr}(\Lambda_l^{-1})$ in equation (8) for $r_l$ results in optimal weighting of the interference contributions from different interfering sectors.

An estimate of the transmitted vector $x_j$ for desired sector j may be expressed as:

$$\hat{x}_j = r - \sum_{\ell \neq j} e_\ell = r - e_{os,j}, \quad \text{Eq (17)}$$

where $\hat{x}_j$ is an estimate of $x_j$, and $e_{os,j}$ is the sum of the cancellation signals from the other sectors. Vector $\hat{x}_j$ includes the signal component from desired sector j and has the interference components from the other sectors canceled. Equations (16) and (17) maximize the signal-to-noise-and-interference ratio (SINR) of vector $\hat{x}_j$ under an assumption that the data symbols from each sector are independent and zero mean.

Vector $\hat{x}_j$ may be despread and decovered to obtain data symbol estimates for a desired traffic channel n from desired sector j, as follows:

$$\hat{s}_{j,n} = w_n^T \cdot C_j^H \cdot \hat{x}_j. \quad \text{Eq (18)}$$

Figure 7:
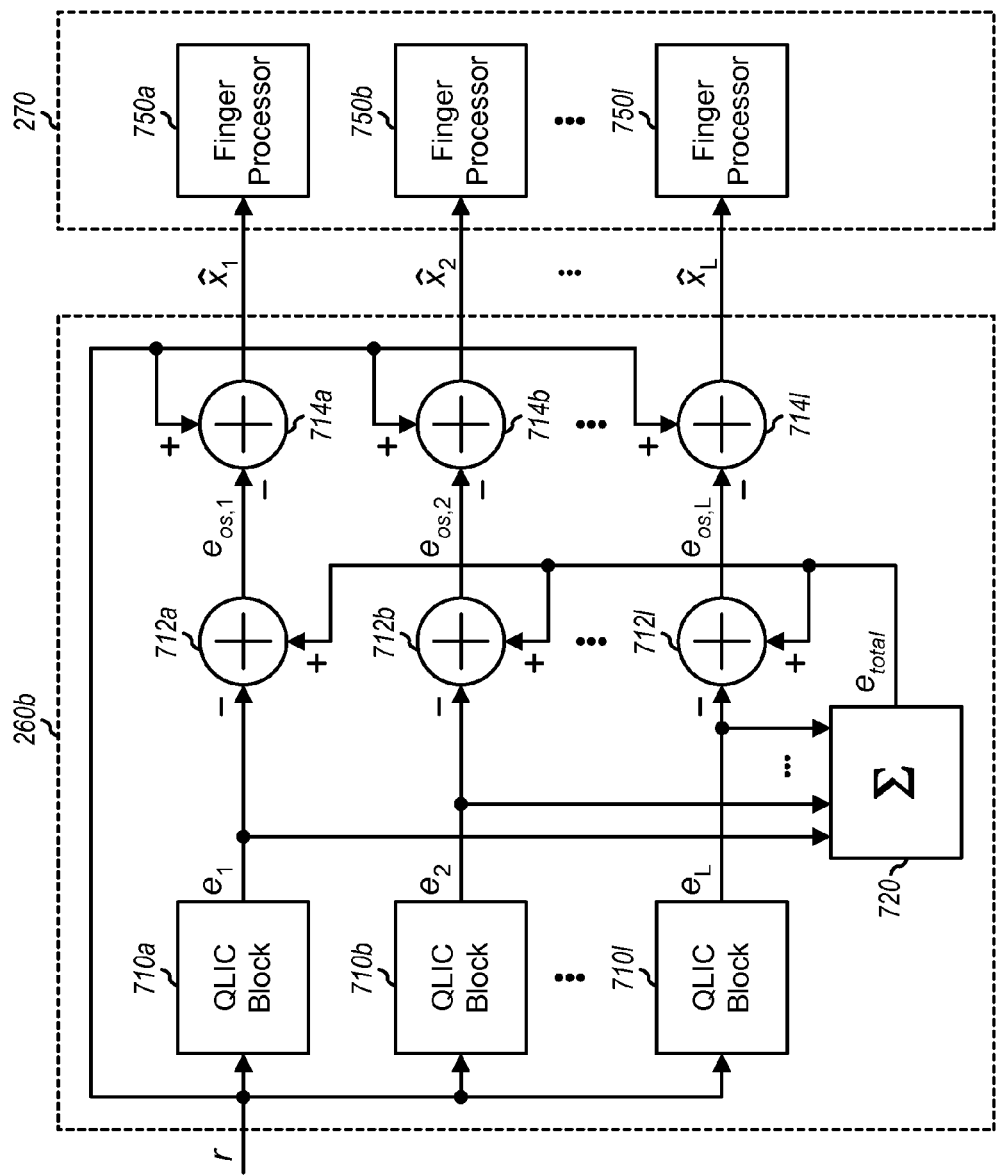
FIG. 7 shows a parallel multi-sector interference canceller.

FIG. 7 shows a block diagram of a parallel multi-sector interference canceller 260b, which is another embodiment of interference canceller 260 in FIG. 2. Interference canceller 260b performs interference cancellation for multiple (L) sectors and provides estimates of the signals transmitted by these L sectors.

Within interference canceller 260b, the received signal r (which corresponds to the received samples from receiver 254) is provided to L QLIC blocks 710a through 710l for the L sectors. Each QLIC block 710 derives a cancellation signal for its assigned sector and may be implemented as described below. A combiner 720 sums the cancellation signals $e_1$ through $e_L$ for all L sectors and provides a total cancellation signal $e_{total}$. For each sector j, a summer 712 subtracts the cancellation signal $e_j$ for that sector from the total cancellation signal $e_{total}$ and provides an other-sector cancellation signal $e_{os,j}$, which corresponds to the term $$\sum_{\ell \neq j} e_\ell$$

in equation (17). For each sector j, a summer 714 subtracts the other-sector cancellation signal $e_{os,j}$ for that sector from the received signal r and provides a signal estimate $\hat{x}_j$ for the sector. The signal estimate $\hat{x}_j$ for each sector has the cancellation signals from the other L−1 sectors removed. Summers 714a through 714l provide the signal estimates $\hat{x}_1$ through $\hat{x}_L$ for the L sectors to L finger processors 750a through 750l, respectively, within rake receiver 270. Each finger processor 750 may perform demodulation as shown in equation (18) for its assigned sector.

FIG. 7 shows an embodiment of interference cancellation for multiple sectors in parallel. The cancellation signals for the L sectors are derived in parallel based on the received signal r. The accuracy of the cancellation signal for each sector is affected by the interference from all other sectors. The signal estimate $\hat{x}_j$ for each sector is derived based on the cancellation signal $e_j$ for that sector, the total cancellation signal $e_{total}$ for all L sectors, and the received signal r.

Interference cancellation for multiple sectors may also be performed in a successive manner, i.e., a sequential or cascaded manner. Successive interference cancellation for L sectors may be performed in L successive stages, with each stage canceling the interference from one sector. The interference cancellation at each stage may be performed based on the output from a preceding stage, which may have the interference from all prior stages removed and may thus be "cleaner" than the received signal. Successive interference cancellation may improve performance. For example, if different sectors cause different amounts of interference, then interference cancellation may first be performed for a strong sector to suppress the signal components from this sector and may then be performed for a weaker sector. The interference cancellation for the weaker sector may improve because the signal contributions from the strong sector have been attenuated. The cancellation of the strong sector reduces the $\sigma_l^2$ term in equation (6) for the weaker sector, which makes the gain matrix $\underline{G}_j$ for the weaker sector more prominent and improves the characteristics of the covariance matrix $\underline{\Lambda}_j$ for the weaker sector. Hence, cancellation of the strong sector may improve interference cancellation for the weaker sector.

FIG. 8A shows a block diagram of a cascaded two-sector interference canceller 260c, which is yet another embodiment of interference canceller 260 in FIG. 2. In this embodiment, the interference from sector a is first canceled, and the interference from sector b is then canceled to generate a signal estimate for desired sector j.

Within interference canceller 260c, the received signal r is provided to a QLIC block 810a, which derives a cancellation signal $e_a^1$ for sector a. The superscript '1' in $e_a^1$ is for the stage number, and the subscript a is for the sector being processed by the stage. A summer 812a subtracts the cancellation signal $e_a^1$ from the received signal r and provides an intermediate signal $r^1$ having the signal component and distortion noise for sector a suppressed. A QLIC block 810b receives the intermediate signal $r^1$ and derives a cancellation signal $e_b^2$ for sector b. A summer 812b subtracts the cancellation signal $e_b^2$ from the received signal r and provides a signal estimate $\hat{x}_j$ containing the signal component for desired sector j but having the interference from sectors a and b suppressed. A finger processor 750j within rake receiver 270 performs demodulation on the signal estimate $\hat{x}_j$ for desired sector j.

Sector a may be desired sector j or another sector. If sector a is desired sector j, then the signal component for the desired sector is first canceled, which may improve the cancellation of the interference from sector b in the second stage.

FIG. 8B shows a block diagram of a cascaded multi-sector interference canceller 260d, which is yet another embodiment of interference canceller 260 in FIG. 2. In this embodiment, the signal components for L sectors are successively suppressed in L stages.

Within interference canceller 260d, the received signal r is provided to QLIC block 810a, which derives a cancellation signal $e_a^1$ for sector a. Summer 812a subtracts the cancellation signal $e_a^1$ from the received signal r and provides an intermediate signal $r^1$ having the signal component for sector a suppressed. QLIC block 810b receives the intermediate signal $r^1$ and derives a cancellation signal $e_b^2$ for sector b. A summer 812b subtracts the cancellation signal $e_b^2$ from the intermediate signal $r^1$ and provides an intermediate signal $r^2$ having the signal components for both sectors a and b suppressed.

Each subsequent stage i operates in similar manner as stage 2. QLIC block 810 for stage i receives the intermediate signal $r^{i-1}$ from prior stage i−1 and derives a cancellation signal $e_i^i$ for sector i assigned to stage i. Summer 812 for stage i subtracts the cancellation signal $e_i^i$ from the intermediate signal $r^{i-1}$ and provides to the next stage an intermediate signal $r^i$ having the signal components for all sectors assigned to the current and prior stages suppressed.

Summer 812l for the last stage provides an intermediate signal $r^L$ having the signal components from all L sectors suppressed. For each sector i, for i=1, ..., L−1, a summer 814 adds the cancellation signal $e_i^i$ for sector i with the intermediate signal $r^L$ and provides a signal estimate $\hat{x}_i$ for that sector. The intermediate signal $r^{L-1}$ has the interference from sectors 1 through L−1 suppressed and is provided as the signal estimate $\hat{x}_L$ for sector L.

In an embodiment, the sectors are assigned to the stages based on their signal strength. For example, the strongest received sector may be assigned to stage 1, the next strongest received sector may be assigned to stage 2, and so on. In another embodiment, the sector with the earliest arriving signal may be assigned to stage 1, the sector with the next arriving signal may be assigned to stage 2, and so on. The sectors may also be assigned to the stages in other manners.

Figure 8:
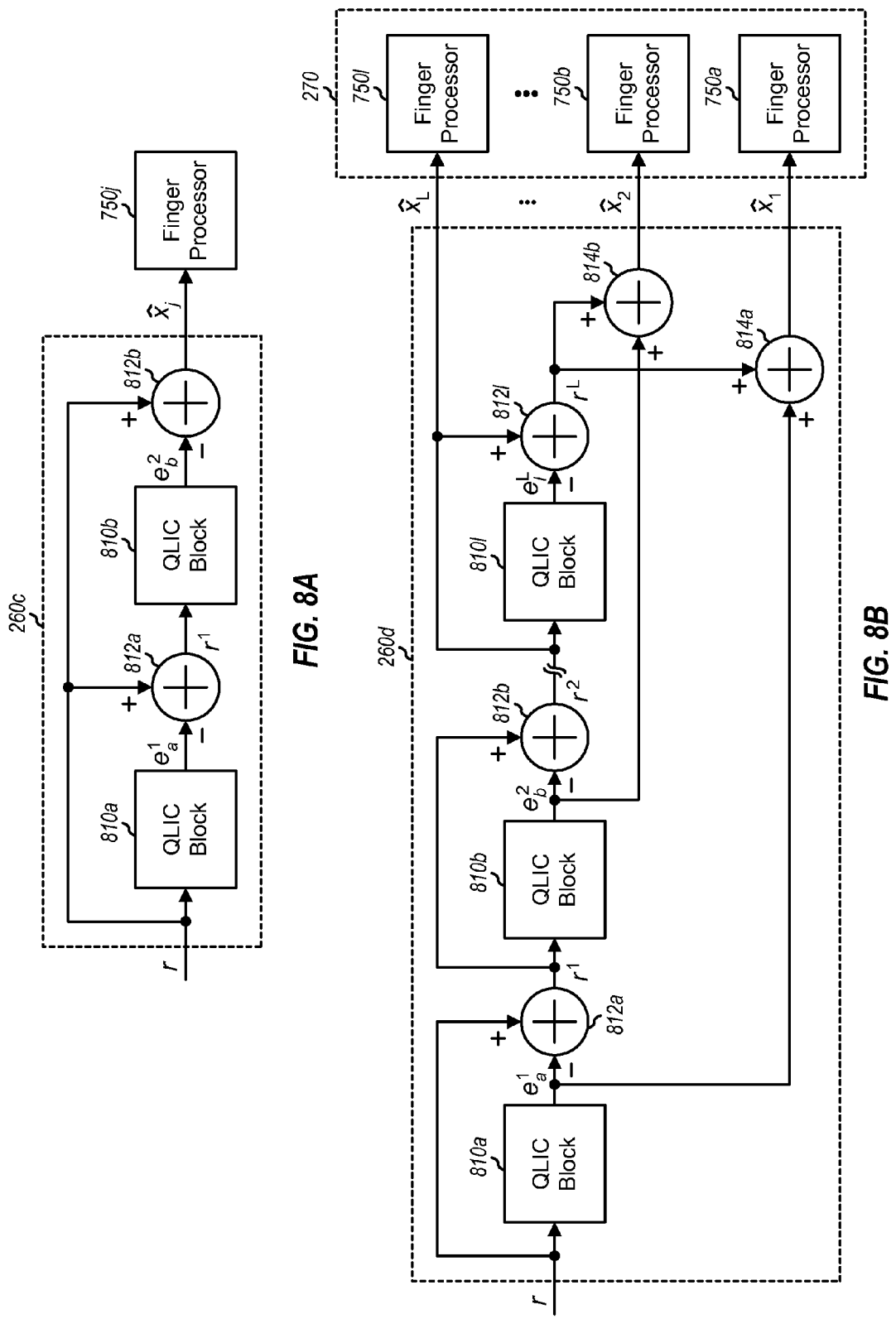
FIG. 8A shows a cascaded two-sector interference canceller.
FIG. 8B shows a cascaded multi-sector interference canceller.
Figure 9:
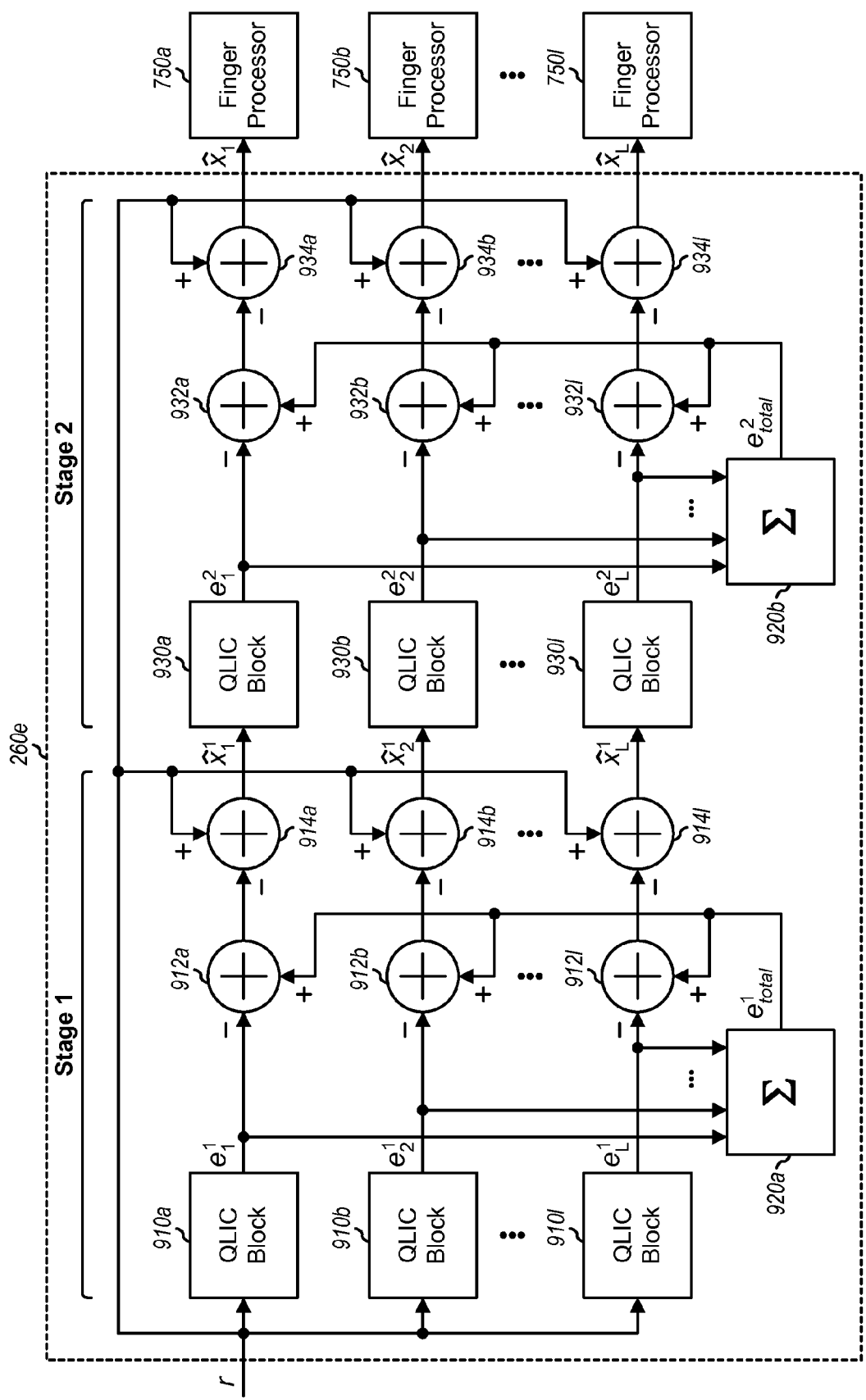
FIG. 9 shows a parallel two-stage interference canceller.

FIG. 9 shows a block diagram of a parallel two-stage interference canceller 260e, which is yet another embodiment of interference canceller 260 in FIG. 2. Interference canceller 260e is a combination of interference canceller 260b in FIG. 7 and interference canceller 260c in FIG. 8A.

In the first stage, the received signal r is provided to L QLIC blocks 910a through 910l for L sectors. Each QLIC block 910 derives a cancellation signal for its assigned sector based on the received signal. A combiner 920a sums the cancellation signals $e_1^1$ through $e_L^1$ from all L QLIC blocks 910a through 910l and provides a total cancellation signal $e_{total}^1$ for the first stage. For each sector j, a summer 912 subtracts the cancellation signal $e_j^1$ for that sector from the total cancellation signal $e_{total}^1$ and provides an other-sector cancellation signal $e_{os,j}^1$ for the sector. For each sector j, a summer 914 subtracts the other-sector cancellation signal $e_{os,j}^1$ from the received signal r and provides an initial signal estimate $\hat{x}_j^1$ for the sector. The initial signal estimate for each sector has the cancellation signals from the other L−1 sectors removed. Summers 914a through 914l provide the initial signal estimates $\hat{x}_1^1$ through $\hat{x}_L^1$ for the L sectors.

For the second stage, QLIC blocks 930a through 930l receive the initial signal estimates $\hat{x}_1^1$ through $\hat{x}_L^1$, respectively. Each QLIC block 930 derives a cancellation signal $e_j^2$ for its assigned sector j based on its initial signal estimate $\hat{x}_j^1$. For each sector j, the cancellation signal $e_j^2$ from the second stage is typically a better estimate of the signal component for sector j than the cancellation signal $e_j^1$ from the first stage because $e_j^2$ is derived based on the initial signal estimate $\hat{x}_j^1$ having the interference from the other L−1 sectors suppressed. A combiner 920b sums the cancellation signals $e_1^2$ through $e_L^2$ from all L QLIC blocks 930a through 930l and provides a total cancellation signal $e_{total}^2$ for the second stage. For each sector j, a summer 932 subtracts the cancellation signal $e_j^2$ for that sector from the total cancellation signal $e_{total}^2$ and provides an other-sector cancellation signal $e_{os,j}^2$ for the sector. For each sector j, a summer 934 subtracts the other-sector cancellation signal $e_{os,j}^2$ from the received signal r and provides a final signal estimate $\hat{x}_j$ for the sector. The final signal estimate $\hat{x}_j$ for each sector has the signal components from the other L−1 sectors suppressed. Summers 934a through 934l provide the final signal estimates $\hat{x}_1$ through $\hat{x}_L$ for the L sectors to L finger processors 750a through 750l, respectively, within rake receiver 270.

FIGS. 7 through 9 show some interference cancellers that perform interference cancellation for one or multiple sectors. Each QLIC block in FIGS. 7 through 9 may derive a cancellation signal for one signal path of one sector (per path processing), for multiple signal paths of one sector (per sector processing), or for multiple signal paths of multiple sectors (multi-sector processing). The multiple signal paths processed by a given QLIC block may be for one or multiple receive antennas. Other interference cancellers may also be designed based on the description provided herein. For example, the embodiment shown in FIG. 9 may be extended to include more than two cascaded interference cancellation stages.

Figure 10A:
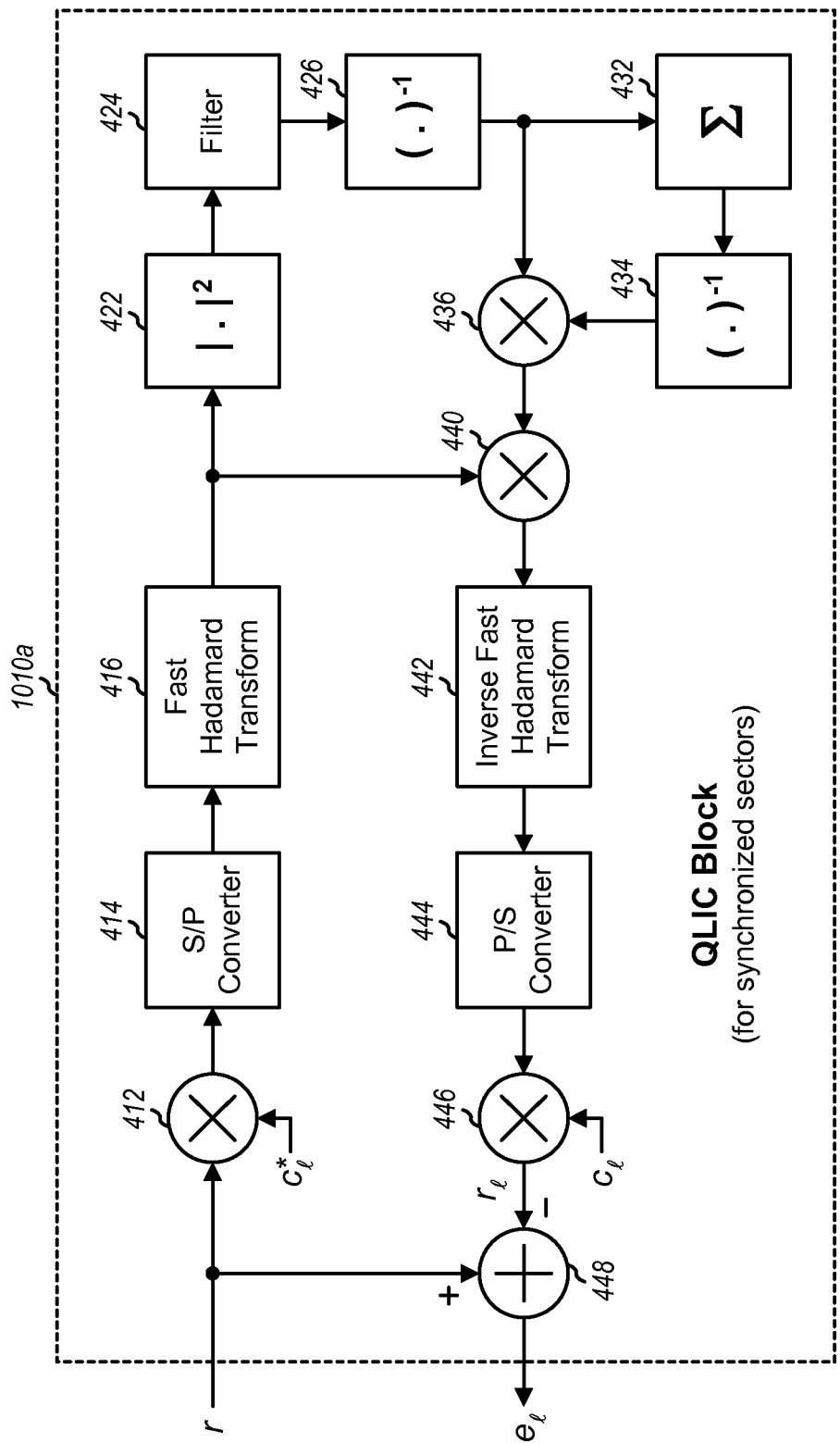
FIGS. 10A and 10B show two embodiments of a quasi-linear interference cancellation (QLIC) block.

FIG. 10A shows a block diagram of a QLIC block 1010a, which may be used for each QLIC block in interference cancellers 260b through 260e in FIGS. 7 through 9. For clarity, FIG. 10A shows QLIC block 1010a being used in the first stage, so that the incoming samples are the received samples for the received signal r. QLIC block 1010a includes all of the units in interference canceller 260a in FIG. 4. QLIC block 1010a further includes a summer 448 that subtracts the interference-canceled samples $r_l$ from the received samples r and provides the cancellation samples $e_l$ for sector l.

Figure 10B:
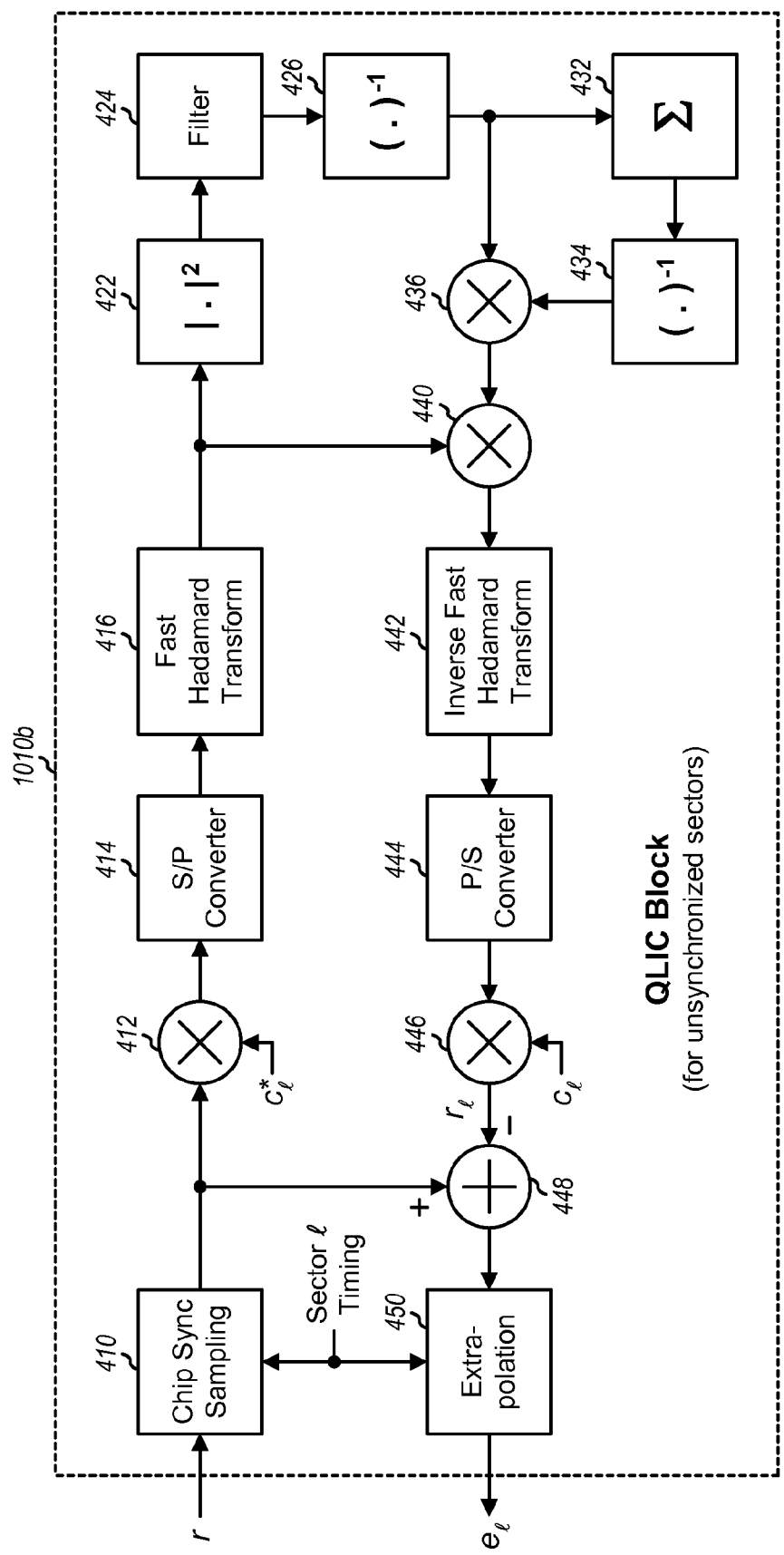

FIG. 10B shows a block diagram of a QLIC block 1010b, which may also be used for each QLIC block in interference cancellers 260b through 260e. QLIC block 1010b performs resampling of the incoming samples to the proper chip timing. Hence, QLIC block 1010b may be used in interference cancellers 260b through 260e even if the sectors are unsynchronized and the signals from these sectors are received not aligned in time at the wireless device. QLIC block 1010b includes units 410 and 450 in addition to all of the units in interference canceller 260a in FIG. 4. Unit 410 performs resampling (e.g., interpolation) on the incoming samples based on the timing of sector l to synchronize with chip timing. Unit 410 may obtain the received samples at twice the chip rate (or chip×2) and may generate interpolated samples at chip rate (or chip×1) and with the timing of sector l. Unit 450 performs extrapolation on the samples from summer 448 and provides cancellation samples at the same rate and with the same timing as the incoming samples.

In FIGS. 7 through 9, each QLIC block may operate based on the timing of the sector assigned to that QLIC block. The extrapolation by unit 450 aligns the timing of the cancellation samples for all sectors so that these samples can be summed by combiners 720, 920a and 920b.

The interference cancellation in each QLIC block is performed based on the covariance matrix $\Lambda_l$, which may be estimated (1) based on the received symbols in vector $u_l$ as shown in FIGS. 4, 10A and 10B, or (2) by estimating the components of $\Lambda_l$ as described above. The estimation of matrix $\Lambda_l$ may be performed with one or more filters having one or more time constants selected to provide good estimation performance and to track changes in the operating environment. These changes may include changes to the wireless channel response $h_l$, changes to the traffic channel gain $g_{i,n}$ due to power control (e.g., 0.5 dB per 1.25 ms in cdma2000), instantaneous changes of the traffic channels at frame boundaries due to changes in data rates and/or traffic channel assignment, and/or other changes. It is desirable to obtain an accurate estimate of $\Lambda_l$ while quickly adapting to changes in the environment. Such robust tracking capability may improve interference cancellation performance.

Tracking is more challenging for a cascaded interference canceller with multiple stages because of latency introduced by each stage. Tracking performance for a cascaded interference canceller may be improved as described below.

For a cascaded interference canceller with M stages, where M≥2, the interference-canceled signal for each sector in each stage may be expressed as:

$$r_\ell^m = \frac{1}{tr(\Delta_{\ell,m}^{-1})} \cdot C_\ell \cdot \underline{W} \cdot \Delta_{\ell,m}^{-1} \cdot \underline{W}^T \cdot C_\ell^H \cdot \hat{x}_\ell^{m-1}, \text{ for } m = 1, \ldots, M, \quad \text{Eq (19)}$$

where $\hat{x}_l^{m-1}$ is the incoming signal for sector l in stage m,
$r_l^m$ is the interference-canceled signal for sector l in stage m, and
$\Lambda_{l,m}$ is the covariance matrix for sector l in stage m.

As shown in FIG. 9, the incoming signal is equal to the received signal for the first stage, or $\hat{x}_l^0 = r$, and is equal to the output of the prior stage for each subsequent stage.

From equation (19), the received symbols for each sector in each stage may be expressed as:

$$\underline{u}_l^m = \underline{W}^T \cdot \underline{C}_l^H \cdot \hat{x}_l^{m-1}, \text{ for } m=1, \ldots, M, \quad \text{Eq (20)}$$

where $u_l^m$ is the received symbols for sector l in stage m.

The cancellation signal for each sector in each stage may be expressed as:

$$\underline{e}_l^m = \hat{x}_l^{m-1} - r_l^m, \text{ for } m=1, \ldots, M, \quad \text{Eq (21)}$$

where $e_l^m$ is the cancellation signal for sector l in stage m.

The signal estimate for each sector in each stage may be expressed as:

$$\hat{x}_l^m = \underline{r} - \sum_{i \neq l} \underline{e}_i^m \quad \text{Eq (22)}$$
$$= \underline{r} - \underline{e}_{os,l}^m,$$
$$\text{for } m = 1, \ldots, M,$$

where $\hat{x}_l^m$ is the signal estimate for sector l in stage m, and
$e_{os,l}^m$ is the other-sector cancellation signal for sector l in stage m.

The covariance matrix $\Lambda_{l,m}$ for each sector in each stage may be expressed as:

$$\Delta_{l,m} = E\{u_l^m \cdot (u_l^m)^H\}, \quad \text{Eq (23)}$$
$$= E\{\underline{W}^T \cdot \underline{C}_l^H \cdot \hat{x}_l^{m-1} \cdot (\hat{x}_l^{m-1})^H \cdot \underline{C}_l \cdot \underline{W}\},$$
$$= N^2 \cdot |h_l|^2 \cdot \underline{G}_l^2 + N \cdot \sigma_{l,m}^2 \cdot I,$$

where $\sigma_{l,m}^2$ is the noise and interference for sector l in stage m.

In the first stage, the interference in the incoming signal has not been suppressed, and $\sigma_{l,m}^2$ may be given as:

$$\sigma_{l,1}^2 = \sum_{i \neq l} \sum_{n=1}^{N} |h_i|^2 \cdot g_{i,n}^2 + N_0. \quad \text{Eq (24)}$$

In equation (24), $N_0$ is the noise component and the double summation is for the interference components from other sectors. In each subsequent stage, the interference components in $\sigma_{l,m}^2$ are reduced by the interference cancellation in prior stage(s).

Equations (23) and (24) indicate that $\sigma_{l,m}^2$ and hence $\Lambda_{l,m}$ are dependent on the QLIC operation in the previous stages.

Each stage may estimate $\underline{\Lambda}_{l,m}$ with a filter, e.g., as shown in FIG. 10A or 10B, and may use the estimate of $\underline{\Lambda}_{l,m}$ to derive the cancellation signal $e_l^m$ for that stage. The filter in each stage introduces latency. Since the output $\hat{x}_l^m$ of one stage is provided as the input of the next stage, the filter latency in each stage ripples to the next stage. The total latency at any given stage is equal to the accumulated latency for all stages from the first stage to that stage. Latency may be problematic for a cascaded interference canceller.

Accelerated tracking for subsequent stages may be achieved by exploiting the structure of the covariance matrix $\underline{\Lambda}_{l,m}$. Equation (23) indicates that $\underline{\Lambda}_{l,m}$ is a sum of two terms: a first term $N^2 \cdot |h_l|^2 \cdot \underline{G}_l^2$ that is common for all stages and a second term $N \cdot \sigma_{l,m}^2 \cdot \underline{I}$ that is different for different stages (typically smaller for later stages). An accurate estimate of $\underline{\Lambda}_{l,m}$ may be derived in each stage by exploiting this structure.

The covariance matrices for stages 1 and m may be expressed as:

$$\underline{\Lambda}_{l,1} = N^2 \cdot |h_l|^2 \cdot \underline{G}_l^2 + N \cdot \sigma_{l,1}^2 \cdot \underline{I}, \text{ and} \quad \text{Eq (25)}$$

$$\underline{\Lambda}_{l,m} = N^2 \cdot |h_l|^2 \cdot \underline{G}_l^2 + N \cdot \sigma_{l,m}^2 \cdot \underline{I}. \quad \text{Eq (26)}$$

The two covariance matrices may be combined as follows:

$$\underline{\Lambda}_{l,m} - \underline{\Lambda}_{l,1} = N \cdot \sigma_{l,m}^2 \cdot \underline{I} - N \cdot \sigma_{l,1}^2 \cdot \underline{I}. \quad \text{Eq (27)}$$

Rearranging the terms in equation (26), $\underline{\Lambda}_{l,m}$ may be expressed as:

$$\underline{\Lambda}_{l,m} = \underline{\Lambda}_{l,1} + (\sigma_{l,m}^2 - \sigma_{l,1}^2) \cdot N \cdot \underline{I}. \quad \text{Eq (28)}$$

Equation (28) indicates that $\underline{\Lambda}_{l,m}$ for stage m may be derived based on $\underline{\Lambda}_{l,m}$ for stage 1 and a scalar indicative of the difference between $\sigma_{l,m}^2$ and $\sigma_{l,1}^2$.

The N elements of $\underline{\Lambda}_{l,m}$ for each stage may be summed as follows:

$$tr(\underline{\Lambda}_{l,m}) = N^2 \cdot |h_l|^2 \cdot tr(\underline{G}_l^2) + N^2 \cdot \sigma_{l,m}^2. \quad \text{Eq (29)}$$

Rearranging the terms in equation (29), $\sigma_{l,m}^2$ may be expressed as:

$$\sigma_{l,m}^2 = \frac{tr(\underline{\Lambda}_{l,m}) - N^2 \cdot |h_l|^2 \cdot tr(\underline{G}_l^2)}{N^2}. \quad \text{Eq (30)}$$

Substituting equation (30) into equation (28), $\underline{\Lambda}_{l,m}$ may be expressed as:

$$\underline{\Lambda}_{l,m} = \underline{\Lambda}_{l,1} + \frac{tr(\underline{\Lambda}_{l,m}) - tr(\underline{\Lambda}_{l,1})}{N} \cdot \underline{I}. \quad \text{Eq (31)}$$

Equation (31) indicates that $\underline{\Lambda}_{l,m}$ may be obtained based on $\underline{\Lambda}_{l,1}$ and the traces of $\underline{\Lambda}_{l,m}$ and $\overline{\underline{\Lambda}}_{l,1}$. The trace of $\underline{\Lambda}_{l,m}$ may be estimated much faster than $\underline{\Lambda}_{l,m}$ can be estimated due to the fact that the trace is a sum over N Walsh bins, which improves reliability due to the averaging over the N Walsh bins. As an example, if N=128, then the trace of $\underline{\Lambda}_{l,m}$ may be estimated 128 times faster than $\underline{\Lambda}_{l,m}$ for a given estimation accuracy.

An estimate of $\underline{\Lambda}_{l,m}$ may be derived in each stage after the first stage, as follows:

$$\hat{\underline{\Lambda}}_{l,m} = \hat{\underline{\Lambda}}_{l,1} + \frac{\hat{S}_{l,m} - \hat{S}_{l,1}}{N} \cdot \underline{I}, \quad \text{Eq (32)}$$

where $S_{l,m} = tr(\underline{\Lambda}_{l,m})$ is the total power for all N Walsh bins for sector l in stage m, $\hat{S}_{l,m}$ is an estimate of $S_{l,m}$, and
$\hat{\underline{\Lambda}}_{l,m}$ is an estimate of $\underline{\Lambda}_{l,m}$.

In equation (32), $\hat{\underline{\Lambda}}_{l,m}$ may be set to zero if the quantity on the right hand side is less than zero, since the noise plus interference cannot be less than zero.

Figure 11:
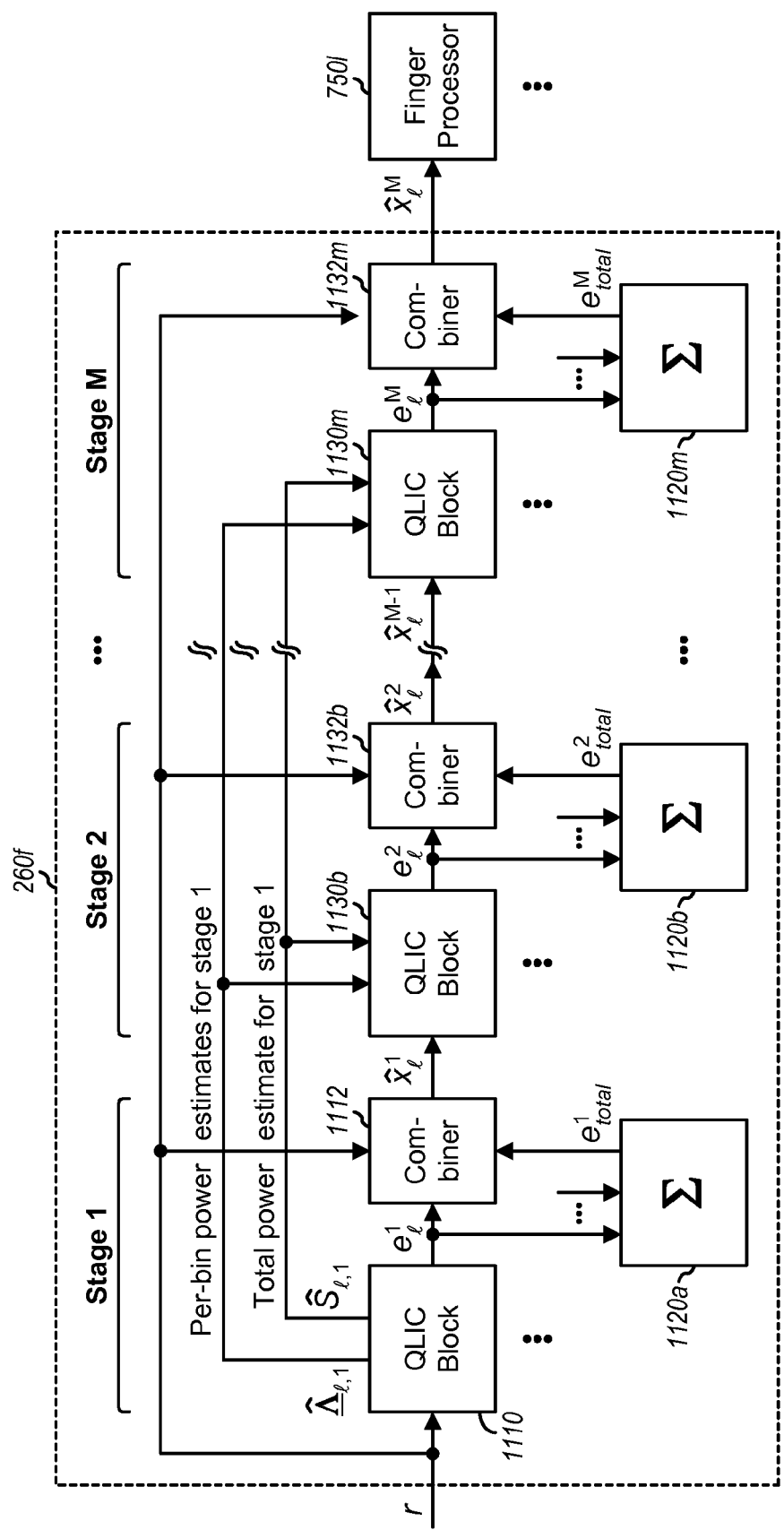
FIG. 11 shows a cascaded interference canceller with accelerated tracking.

FIG. 11 shows a block diagram of a multi-stage interference canceller 260f, which is yet another embodiment of interference canceller 260 in FIG. 2. Interference canceller 260f performs interference cancellation for one or more sectors in M stages, where M≥2. For simplicity, only units pertinent for interference cancellation for one sector l is shown in FIG. 11 and described below.

In the first stage, a QLIC block 1110 derives a cancellation signal $e_l^1$ for sector l based on the received signal r. QLIC block 1110 also derives and provides a total power estimate $\hat{S}_{l,1}$ and per-bin power estimates $\hat{\Lambda}_{l,1}$ for the first stage. A combiner 1120a sums the cancellation signals from all QLIC blocks in the first stage and provides a total cancellation signal $e_{total}^1$ for the first stage. A combiner 1112 derives a signal estimate $\hat{x}_l^1$ for sector l based on the received signal r, the cancellation signal $e_l^1$ for sector l, and the total cancellation signal $e_{total}^1$. Combiner 1112 may be implemented with summers 912 and 914 in FIG. 9.

In each subsequent stage m, where 1<m≤M, a QLIC block 1130 derives a cancellation signal $e_l^m$ for sector l based on an incoming signal $\hat{x}_l^{m-1}$ (which is the output from the prior stage m−1) and the power estimates $\hat{S}_{l,1}$ and $\hat{\Lambda}_{l,1}$ from QLIC block 1110 in the first stage. A combiner 1120 sums the cancellation signals from all QLIC blocks in stage m and provides a total cancellation signal $e_{total}^m$ for stage m. A combiner 1132 derives a signal estimate $\hat{x}_l^m$ for sector l based on the received signal r, the cancellation signal $e_l^m$ for sector l, and the total cancellation signal $e_{total}^m$. Combiner 1132m for the last stage provides the final signal estimate $\hat{x}_l^M$ for sector l to finger processor 7501 within rake receiver 270.

Figure 12A:
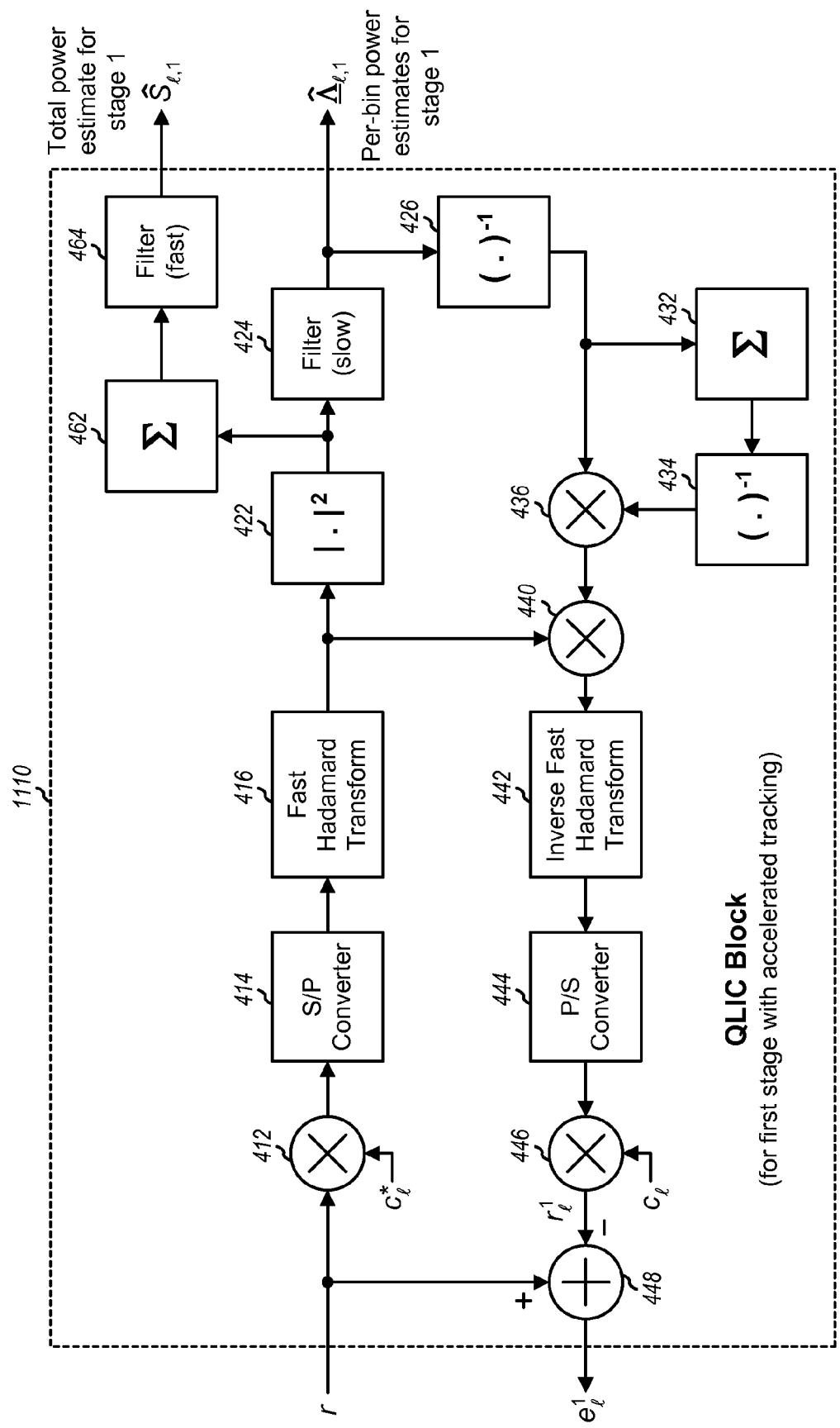
FIG. 12A shows a QLIC block for the first stage with accelerated tracking.

FIG. 12A shows a block diagram of an embodiment of QLIC block 1110, which may be used in the first stage of a cascaded interference canceller such as the one shown in FIG. 11. QLIC block 1110 includes a summer 462 and a filter 464 in addition to all of the units in QLIC block 1010a in FIG. 10A. In each symbol period, unit 422 provides N power values that are the squared magnitude of the received symbols for the N Walsh bins. Summer 462 sums the N power values from unit 422 in each symbol period and provides a total power value for that symbol period. Filter 464 filters the output of summer 462 with a fast time constant and provides the total power estimate $\hat{S}_{l,1}$ for the first stage. Filter 424 filters the N power values from unit 422 with a slow time constant and provides N per-bin power estimates $\hat{\lambda}_{l,1,1}$ through $\hat{\lambda}_{l,N,1}$ for the N Walsh bins, which are the N diagonal elements of matrix $\hat{\Lambda}_{l,1}$ for the first stage. The other units within QLIC block 1110 operate as described above for FIGS. 4 and 10A.

Figure 12B:
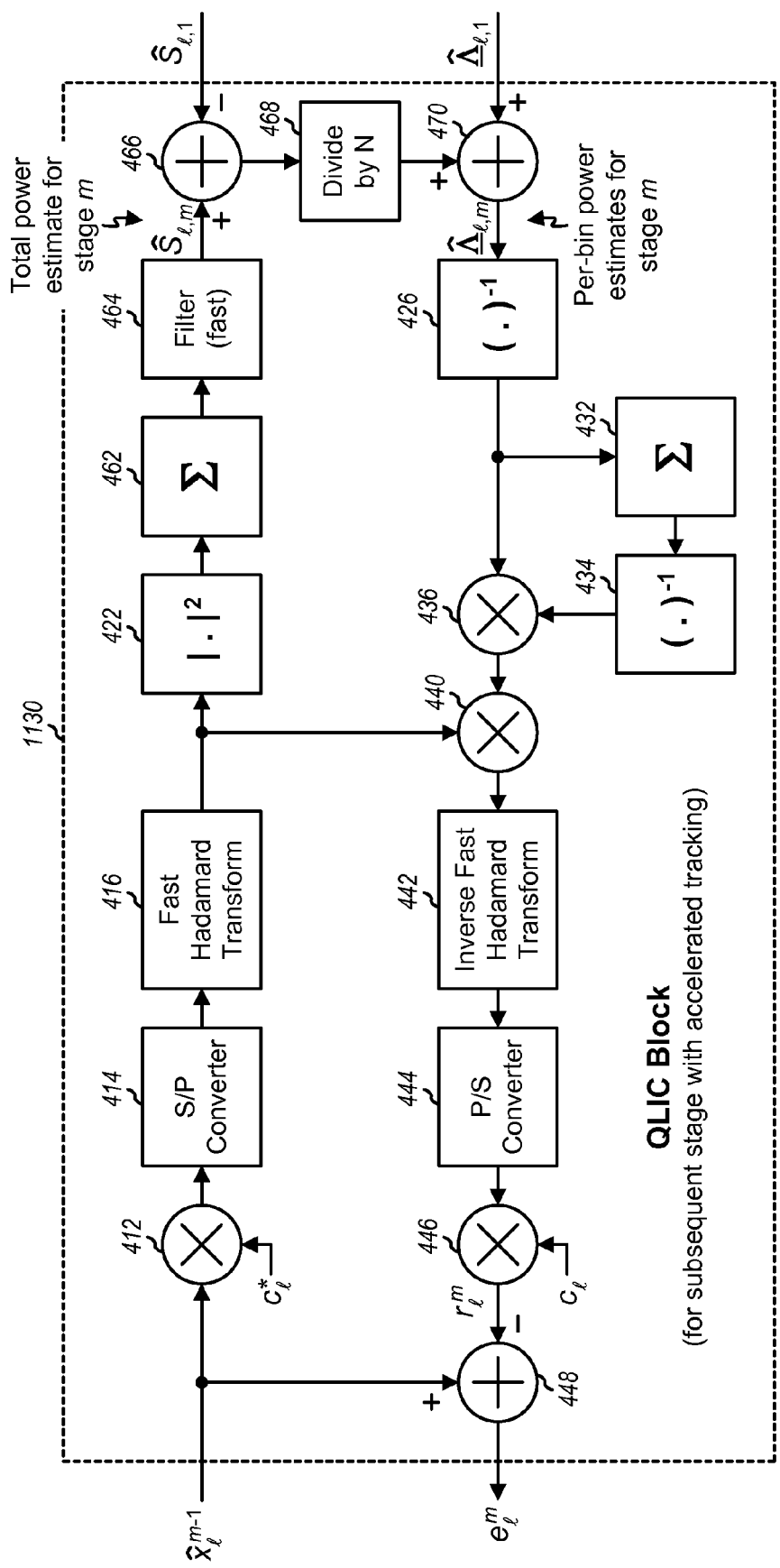
FIG. 12B shows a QLIC block for a subsequent stage.

FIG. 12B shows a block diagram of an embodiment of QLIC block 1130, which may be used in each stage after the first stage of a cascaded interference canceller. QLIC block 1130 includes all of the units in QLIC block 1110 except for filter 424. QLIC block 1130 further includes summers 466 and 470 and a divider 468.

Within QLIC block 1130, summer 462 and filter 464 derive a total power estimate $\hat{S}_{l,m}$ for stage m, as described above for FIG. 12A. Summer 466 receives the total power estimate $\hat{S}_{l,1}$ for the first stage and subtracts $\hat{S}_{l,1}$ from $\hat{S}_{l,m}$. Divider 468 divides the output of summer 466 by N and provides the quantity $(\hat{S}_{l,m} - \hat{S}_{l,1})/N$. Summer 470 receives the per-bin power estimates $\hat{\lambda}_{l,1,1}$ through $\hat{\lambda}_{l,N,1}$ in matrix $\hat{\Lambda}_{l,1}$ from QLIC block 1110 for the first stage, sums each per-bin power estimate $\hat{\lambda}_{l,n,1}$ with the output of divider 468, and provides N per-bin power estimates $\hat{\lambda}_{l,1,m}$ through $\hat{\lambda}_{l,N,m}$ for the N Walsh bins, which are the N diagonal elements of matrix $\hat{\Lambda}_{l,m}$ for stage m. As shown in FIG. 12B, the per-bin power estimates for subsequent stage m may be derived with just filter 464, and filter 424 is not needed. Units 426 through 440 operate on the per-bin power estimates for stage m as described above for FIGS. 4 and 10A.

To achieve accelerated tracking and good estimation performance, a shorter time constant may be selected for the "fast" filter 464 used to derive $\hat{S}_{l,1}$ and $\hat{S}_{l,m}$, and a longer time constant may be selected for the "slow" filter 424 used to derive $\hat{A}_{l,1}$. In an embodiment, the time constant for the slow filter may be approximately 64 symbols in duration, which corresponds to 6.7 ms for 128-chip symbols at a chip rate of 1.2288 Mcps in cdma2000. In an embodiment, the time constant for the fast filter may be 0 to 4 symbols in duration, which corresponds to 0 to 416 microseconds (μs) for 128-chip symbols at the chip rate of 1.2288 Mcps. A time constant of 0 corresponds to no filtering, in which case the output of summer 462 is provided as $\hat{S}_{l,1}$ or $\hat{S}_{l,m}$. Other values may also be used for the time constants for the fast and slow filters.

Figure 13:
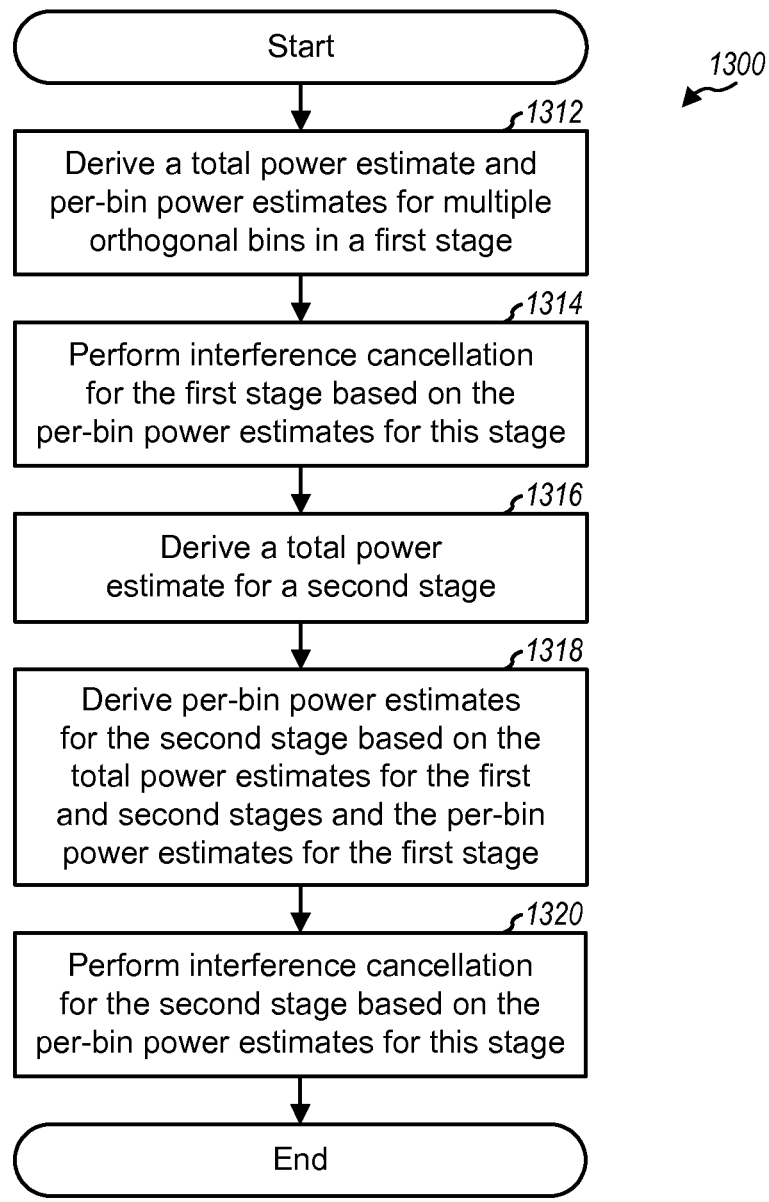
FIG. 13 shows a process for performing cascaded interference cancellation.

FIG. 13 shows an embodiment of a process 1300 for performing interference cancellation in multiple stages. A total power estimate and per-bin power estimates for multiple orthogonal bins are derived for a first stage, e.g., based on the received symbols for this stage (block 1312). The total power estimate for the first stage may be derived based on a first filter having a first time constant, which may be zero or larger. The per-bin power estimates for the first stage may be derived based on a second filter having a second time constant that is longer than the first time constant. Interference cancellation is performed for the first stage based on the per-bin power estimates for this stage (block 1314). A total power estimate is derived for a second stage, e.g., based on the received symbols for this stage (block 1316). Per-bin power estimates are also derived for the second stage based on the total power estimates for the first and second stages and the per-bin power estimates for the first stage (block 1318). Interference cancellation is performed for the second stage based on the per-bin power estimates for this stage (block 1320). The processing for each subsequent stage may be performed in similar manner as for the second stage.

A wireless device may maintain one or more sets of sectors such as (1) an active set containing sectors with which the wireless device is in communication, (2) a neighbor set containing sectors that are neighbors of the sectors in the active set, (3) a candidate set containing sectors that are strongly received by the wireless device and are candidates for inclusion in the active set, and/or (4) some other sector sets. The interference cancellation may be performed in various manners. In an embodiment, interference cancellation is performed for sectors that are in the active set. The wireless device typically receives these sectors strongly and further has timing and multipath information to effectively perform interference cancellation for these sectors. In another embodiment, interference cancellation is performed for as many sectors as possible based on the processing capability of the wireless device. The sectors may be selected for interference cancellation based on their received signal strength or some other criteria The interference cancellation techniques described herein may be implemented by various means. For example, these techniques may be implemented in hardware, firmware, software, or a combination thereof. For a hardware implementation, the processing units used to perform interference cancellation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software or firmware implementation, the interference cancellation techniques may be implemented with modules (e.g., procedures, functions, and so on) that perform the functions described herein. The software and/or firmware codes may be stored in a memory (e.g., memory 292 in FIG. 2) and executed by a processor (e.g., processor 290). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to derive power estimates for multiple orthogonal bins by estimating at least two components for each of the multiple orthogonal bins, one of the at least two components based on at least one gain estimate and another one based on an interference estimate of each of the multiple orthogonal bins and then combining the at least two components, and to support interference cancellation using the power estimates for the multiple orthogonal bins; and
a memory coupled to the at least one processor.

2. The apparatus of claim 1, wherein the at least one processor is configured to derive a channel gain estimate forming at least part of the at least one gain estimate for a communication channel, to derive a noise and the interference estimate, and to derive the power estimates for the multiple orthogonal bins based on the channel gain estimate and the noise and the interference estimate.

3. The apparatus of claim 2, wherein the at least one processor is configured to derive an initial power estimate for a null orthogonal bin, and to derive the noise and the interference estimate based on the initial power estimate for the null orthogonal bin.

4. The apparatus of claim 2, wherein the at least one processor is configured to obtain initial power estimates for the multiple orthogonal bins, and to derive the noise and the interference estimate based on a smallest initial power estimate among the initial power estimates for the multiple orthogonal bins.

5. The apparatus of claim 2, wherein the at least one processor is configured to derive the channel gain estimate based on a pilot received via the communication channel.

6. The apparatus of claim 1, wherein the at least one processor is configured to derive a channel gain estimate forming at least part of the at least one gain estimate for a communication channel, to derive a noise and the interference estimate, to derive a bin gain estimate forming at least part of the at least one gain estimate for each of the multiple orthogonal bins, and to derive a power estimate for each orthogonal bin based on the channel gain estimate, the noise and the interference estimate, and the bin gain estimate for the orthogonal bin.

7. The apparatus of claim 6, wherein the at least one processor is configured to derive an initial power estimate for each orthogonal bin, and to derive the bin gain estimate for each orthogonal bin based on the initial power estimate for the orthogonal bin and a pilot power estimate.

8. A method comprising:
deriving power estimates for multiple orthogonal bins by estimating at least two components for each of the multiple orthogonal bins, one of the at least two components based on at least one gain estimate and another one based on an interference estimate of each of the multiple orthogonal bins and then combining the at least two components; and
performing interference cancellation in an interference canceller using the power estimates for the multiple orthogonal bins.

9. The method of claim 8, wherein the deriving the power estimates for the multiple orthogonal bins comprises
deriving a channel gain estimate forming at least part of the at least one gain estimate for a communication channel,
deriving a noise and the interference estimate, and
deriving the power estimates for the multiple orthogonal bins based on the channel gain estimate and the noise and the interference estimate.

10. The method of claim 8, wherein the deriving the power estimates for the multiple orthogonal bins comprises
deriving a channel gain estimate forming at least part of the at least one gain estimate for a communication channel,
deriving a noise and the interference estimate,
deriving a bin gain estimate forming at least part of the at least one gain estimate for each of the multiple orthogonal bins, and
deriving a power estimate for each orthogonal bin based on the channel gain estimate, the noise and the interference estimate, and the bin gain estimate for the orthogonal bin.

11. The method of claim 8, wherein the deriving the power estimates for the multiple orthogonal bins comprises
deriving a channel gain estimate forming at least part of the at least one gain estimate for a communication channel,
deriving initial power estimates for the multiple orthogonal bins,
deriving a noise and the interference estimate based on the initial power estimates,
deriving bin gain estimates forming at least part of the at least one gain estimate for the multiple orthogonal bins based on the initial power estimates, and
deriving the power estimates for the multiple orthogonal bins based on the channel gain estimate, the noise and the interference estimate, and the bin gain estimates.

12. An apparatus comprising:
means for deriving power estimates for multiple orthogonal bins by estimating at least two components for each of the multiple orthogonal bins, one of the at least two components based on at least one gain estimate and another one based on an interference estimate of each of the multiple orthogonal bins and then combining the at least two components; and
means for performing interference cancellation using the power estimates for the multiple orthogonal bins.

13. The apparatus of claim 12, wherein the means for deriving the power estimates for the multiple orthogonal bins is further configured
for deriving a channel gain estimate forming at least part of the at least one gain estimate for a communication channel,
for deriving a noise and the interference estimate, and
for deriving the power estimates for the multiple orthogonal bins based on the channel gain estimate and the noise and the interference estimate.

14. The apparatus of claim 12, wherein the means for deriving the power estimates for the multiple orthogonal bins is further configured
for deriving a channel gain estimate forming at least part of the at least one gain estimate for a communication channel,
for deriving a noise and the interference estimate,
for deriving a bin gain estimate forming at least part of the at least one gain estimate for each of the multiple orthogonal bins, and
for deriving a power estimate for each orthogonal bin based on the channel gain estimate, the noise and the interference estimate, and the bin gain estimate for the orthogonal bin.

15. The apparatus of claim 12, wherein the means for deriving the power estimates for the multiple orthogonal bins is further configured
for deriving a channel gain estimate forming at least part of the at least one gain estimate for a communication channel,
for deriving initial power estimates for the multiple orthogonal bins,
for deriving a noise and the interference estimate based on the initial power estimates,
for deriving bin gain estimates forming at least part of the at least one gain estimate for the multiple orthogonal bins based on the initial power estimates, and
for deriving the power estimates for the multiple orthogonal bins based on the channel gain estimate, the noise and the interference estimate, and the bin gain estimates.

16. An apparatus comprising:
at least one processor configured to perform interference cancellation in a first stage, to derive a total power estimate and a per-bin power estimate for the first stage, and to support interference cancellation in a second stage using the total power estimate and the per-bin power estimate for the first stage; and
a memory coupled to the at least one processor.

17. The apparatus of claim 16, wherein the at least one processor is configured to derive per-bin power estimates for multiple orthogonal bins for the first stage, and to perform interference cancellation in the first stage based on the per-bin power estimates.

18. The apparatus of claim 17, wherein the at least one processor is configured to derive a total power estimate for the second stage, to derive per-bin power estimates for the second stage based on the total power estimates for the first and second stages and the per-bin power estimates for the first stage, and to perform interference cancellation in the second stage based on the per-bin power estimates for the second stage.

19. The apparatus of claim 17, wherein the at least one processor is configured to obtain power values for the multiple orthogonal bins in the first stage, to sum the power values for the multiple orthogonal bins to obtain a total power value, to derive the total power estimate for the first stage based on the total power value, and to derive the per-bin power estimates for the first stage based on the power values for the multiple orthogonal bins.

20. The apparatus of claim 16, wherein for the first stage of interference cancellation the at least one processor is configured to process received samples to isolate a signal from a transmitter and obtain input samples, to transform the input samples based on a first transform to obtain received symbols for multiple orthogonal bins, to derive multiple gains based on the total power estimate and the per-bin power estimate, to scale the received symbols with the multiple gains to obtain scaled symbols, and to transform the scaled symbols based on a second transform to obtain output samples having interference from the transmitter canceled.

21. The apparatus of claim 20, wherein for the first stage of interference cancellation the at least one processor is configured to derive per-bin power estimates for the multiple orthogonal bins based on the received symbols, and to derive the multiple gains based on the per-bin power estimates.

22. The apparatus of claim 20, wherein for the first stage of interference cancellation the at least one processor is configured to derive a per-bin power estimate for each orthogonal bin based on received symbols for the orthogonal bin, to derive a gain for each orthogonal bin based on an inverse of the per-bin power estimate for the orthogonal bin, and to scale the received symbols for each orthogonal bin based on the gain for the orthogonal bin.

23. The apparatus of claim 20, wherein the at least one processor is configured to perform resampling based on timing of the transmitter prior to transforming the input samples, and to perform extrapolation based on the timing of the transmitter after transforming the scaled symbols.

24. A method comprising:
performing interference cancellation in a first stage;
deriving a total power estimate and a per-bin power estimate for the first stage; and
performing interference cancellation in a second stage using the total power estimate and the per-bin power estimate for the first stage.

25. The method of claim 24, wherein the performing interference cancellation in the first stage comprises
deriving per-bin power estimates for multiple orthogonal bins for the first stage, and
performing interference cancellation in the first stage based on the per-bin power estimates.

26. The method of claim 24, wherein the deriving the per-bin power estimates for the first stage comprises
deriving per-bin power estimates for multiple orthogonal bins for the first stage.

27. The method of claim 26, wherein the performing interference cancellation in the second stage comprises
deriving a total power estimate for the second stage,
deriving per-bin power estimates for the second stage based on the total power estimates for the first and second stages and the per-bin power estimates for the first stage, and
performing interference cancellation in the second stage based on the per-bin power estimates for the second stage.

28. An apparatus comprising:
means for performing interference cancellation in a first stage;
means for deriving a total power estimate and a per-bin power estimate for the first stage; and
means for performing interference cancellation in a second stage using the total power estimate and the per-bin power estimate for the first stage.

29. The apparatus of claim 28, wherein the means for performing interference cancellation in the first stage comprises
means for deriving per-bin power estimates for multiple orthogonal bins for the first stage, and
means for performing interference cancellation in the first stage based on the per-bin power estimates.

30. The apparatus of claim 28, wherein means for the deriving the per-bin power estimates for the first stage comprises
means for deriving per-bin power estimates for multiple orthogonal bins for the first stage.

31. The apparatus of claim 30, wherein the means for performing interference cancellation in the second stage comprises
means for deriving a total power estimate for the second stage,
means for deriving per-bin power estimates for the second stage based on the total power estimates for the first and second stages and the per-bin power estimates for the first stage, and
means for performing interference cancellation in the second stage based on the per-bin power estimates for the second stage.

* * * * *